United States Patent [19]

Redfern et al.

[11] Patent Number: 6,002,357

[45] Date of Patent: Dec. 14, 1999

[54] SYSTEM FOR AND METHOD OF DETERMINING THE LOCATION OF AN OBJECT IN A MEDIUM

[75] Inventors: Miles Alexander Redfern; Stephen Raymond Pennock, both of Bath, United Kingdom

[73] Assignee: London Electricity PLC, London, United Kingdom

[21] Appl. No.: 09/029,112

[22] PCT Filed: Aug. 16, 1996

[86] PCT No.: PCT/GB96/02019

§ 371 Date: Feb. 18, 1998

§ 102(e) Date: Feb. 18, 1998

[87] PCT Pub. No.: WO97/07416

PCT Pub. Date: Feb. 27, 1997

[30] Foreign Application Priority Data

Aug. 18, 1995 [GB] United Kingdom .................. 9517002

[51] Int. Cl.⁶ ........................................... G01S 13/32
[52] U.S. Cl. ............................... 342/22; 342/27; 342/126
[58] Field of Search ............................ 342/22, 27, 118, 342/126

[56] References Cited

U.S. PATENT DOCUMENTS

| | | | |
|---|---|---|---|
| 3,392,384 | 7/1968 | Wesch | 343/5 |
| 3,831,173 | 8/1974 | Lerner | 343/5 R |
| 4,300,098 | 11/1981 | Huchital et al. | 324/338 |
| 4,308,499 | 12/1981 | Thierbach et al. | 324/337 |
| 4,839,654 | 6/1989 | Ito et al. | 342/22 |
| 5,537,253 | 7/1996 | Van Etten et al. | 342/22 |

FOREIGN PATENT DOCUMENTS

| | | |
|---|---|---|
| 2 061 658 | 5/1981 | United Kingdom . |
| 2 091 513 | 7/1982 | United Kingdom . |
| 2 203 913 | 10/1988 | United Kingdom . |
| WO96/06367 | 2/1996 | WIPO . |

OTHER PUBLICATIONS

"An Estimation Method Buried Pipe Location by Using Zero–Crossed Synthetic Aperture", by Yuji Nagashima et al., Electronics and Communications in Japan, Part 1, vol. 77, No. 6, Jun. 1, 1994, pp. 59–66.

"Detection of Bured Plant", by N. Osumi DEng and K. Ueno, BEng, MSc, IEE Proceedings F (Communications, Radar and Signal Processing), vol. 135, No. 4, ISSN 0143–7070, Aug. 1988, pp. 330–342.

IEE Proceedings, vol. 135 Pt. F. No. 4, Aug. 1988, pp. 289 section 4.2.

*Primary Examiner*—John B. Sotomayor
*Attorney, Agent, or Firm*—Westman, Champlin & Kelly, P.A.

[57] ABSTRACT

The depth of a metal object (for example) beneath the ground (for example) is measured by measuring propagation times of electromagnetic radiation travelling in two different paths within the ground, each from a transmission location via reflection from the object to a receiver location. There should be either multiple transmitter locations, multiple receiver locations or both and the spacing in the ground plane between the transmitter and receiver locations is known. By mathematically manipulating the propagation times for reflected signals travelling in different paths, dependence on the permittivity of the ground itself can be eliminated from the calculation of depth.

31 Claims, 14 Drawing Sheets

FIG. 14.

TARGETS FOUND.

2u  4u  6u  8u  10u  12u  14u

DEPTH MEASUREMENTS.
SYSTEM A.

TARGETS FOUND.

2u  4u  6u  8u  10u  12u  14u

DEPTH MEASUREMENTS.
SYSTEM B.

CORRELATION OF TARGETS FOUND.

2u  4u  6u  8u  10u  12u  14u

COMBINED DEPTH MEASUREMENTS.

FIG. 15.
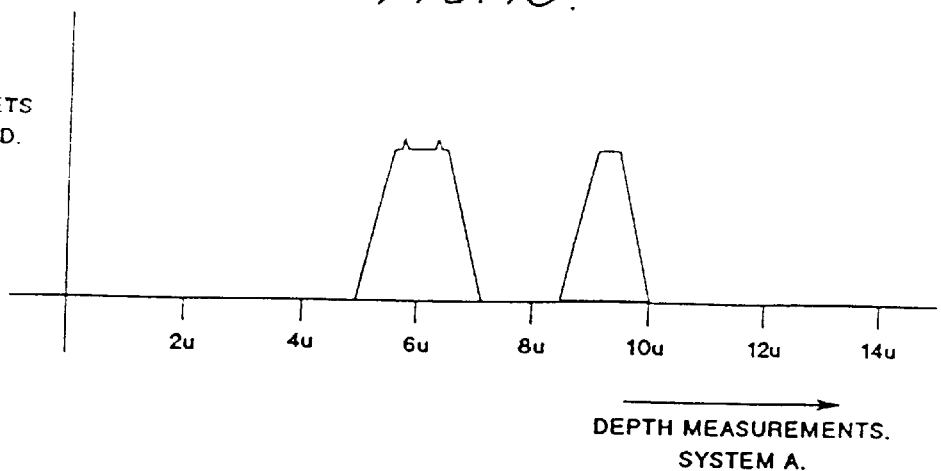
DEPTH MEASUREMENTS.
SYSTEM A.
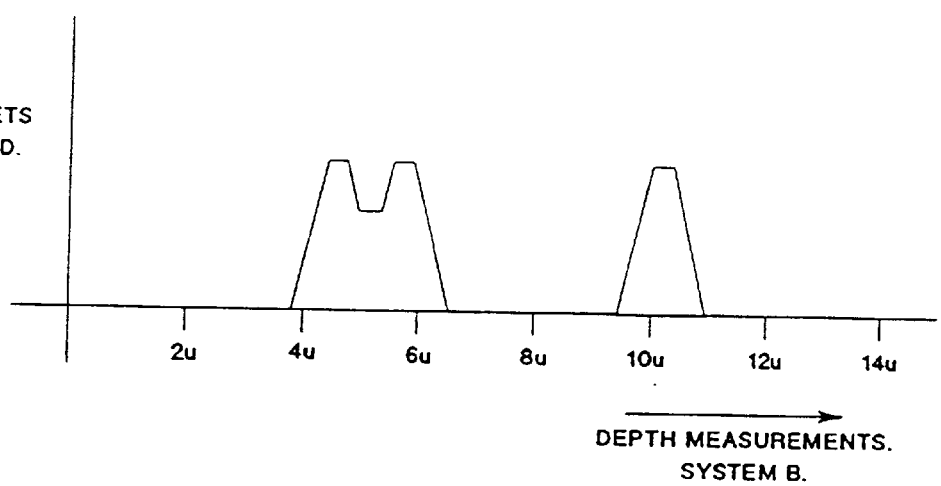
DEPTH MEASUREMENTS.
SYSTEM B.
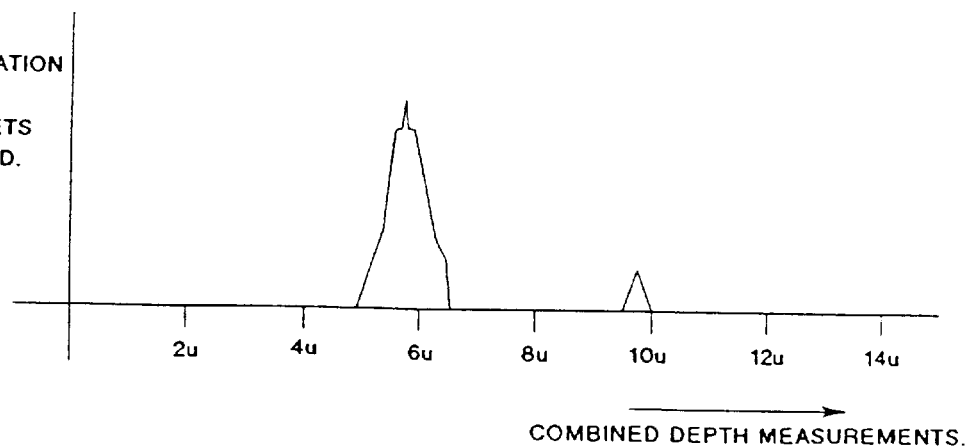
COMBINED DEPTH MEASUREMENTS.

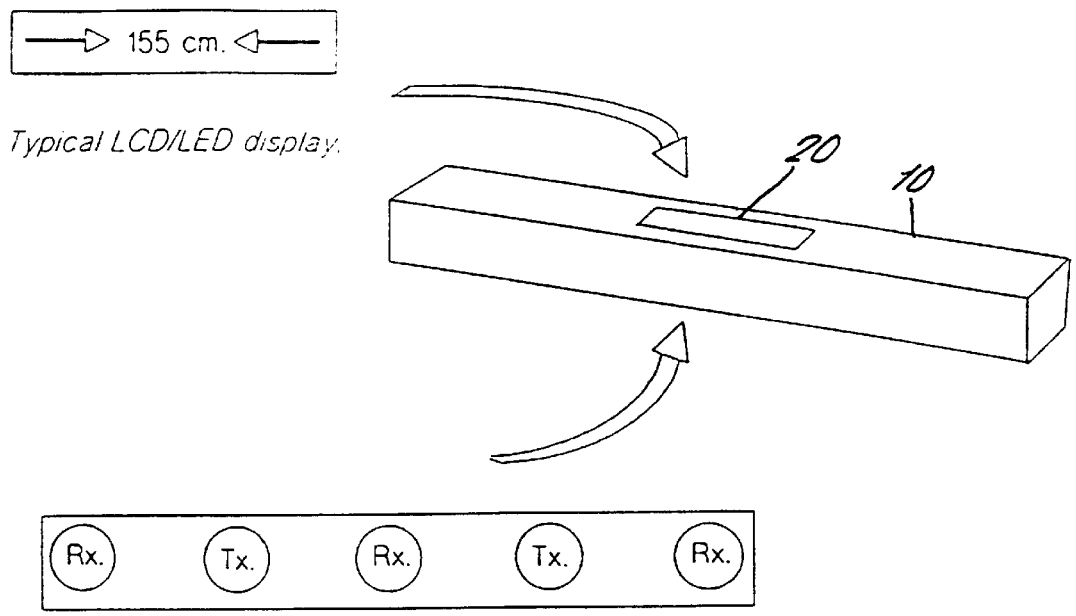
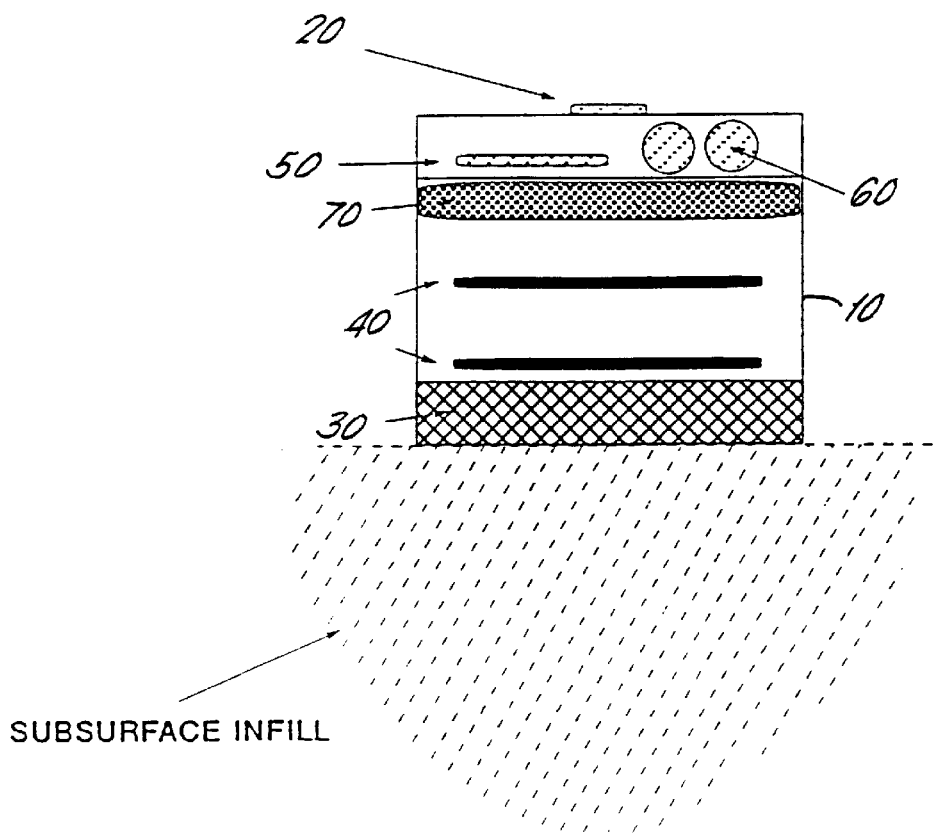

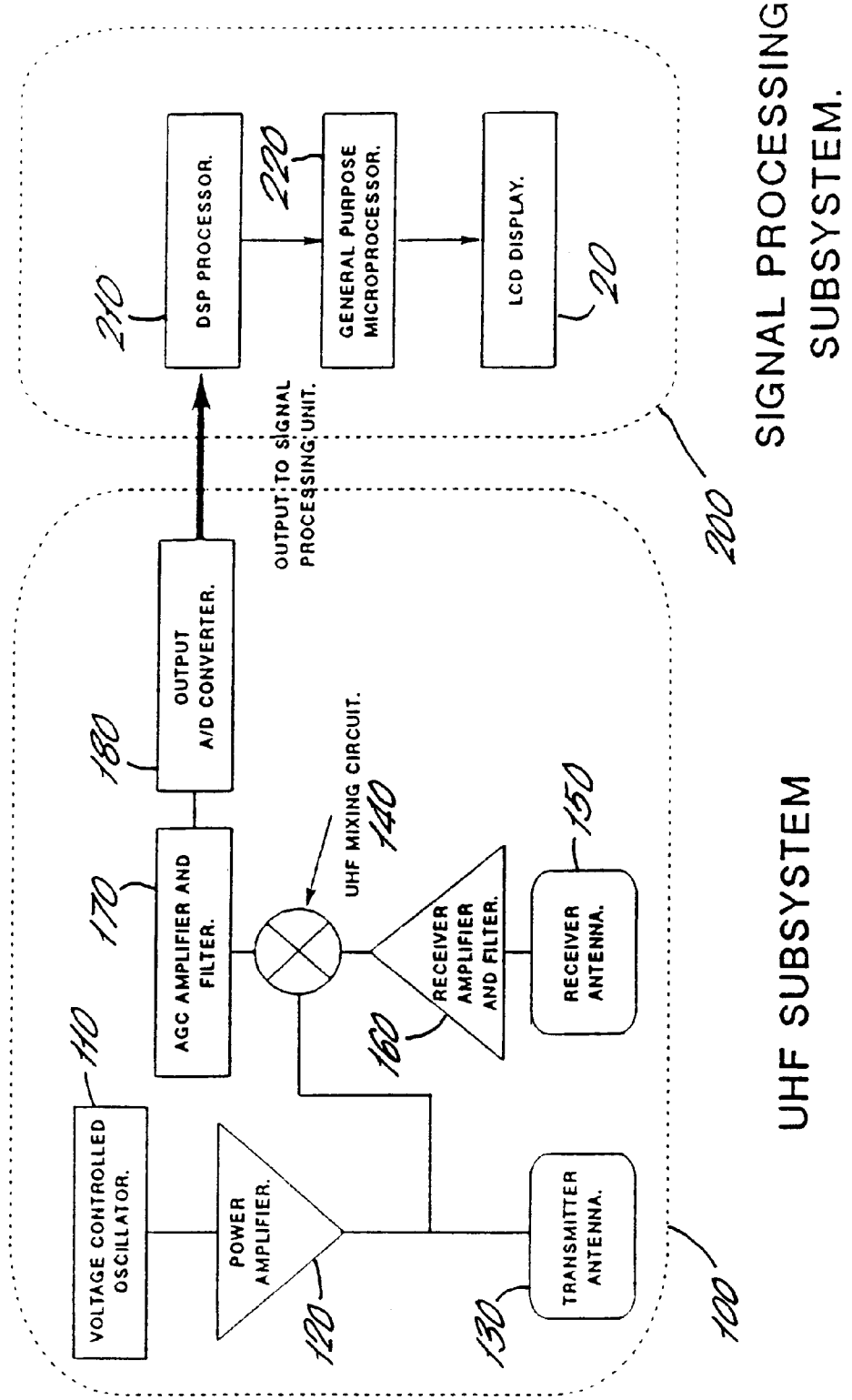

SYSTEM FOR AND METHOD OF DETERMINING THE LOCATION OF AN OBJECT IN A MEDIUM

BACKGROUND OF THE INVENTION

The present invention relates to a method and a system of determining the location of an object in a medium having a permittivity substantially different to that of the permittivity of the object. More particularly, the present invention is concerned with a system for determining the depth of an object in the medium and/or a position on the surface of the medium closest to the object.

The location of objects, particularly metallic objects, in a medium such as the ground, using electromagnetic radiation, is a problem which has received much attention. Objects which lie within a medium and which have a permittivity which is different from that of the surrounding medium such that it will reflect the electromagnetic radiation. Typically the problem has been approached in the prior art by using pulsed radar systems in order to measure the propagation delay of the pulses travelling through the medium. Such systems are described in U.S. Pat. No. 3,775,765 and U.S. Pat. No. 3,806,795.

This technique however suffers from the disadvantage that in order to measure the depth of an object in the medium it is necessary to have some knowledge of the dielectric properties of the medium.

The problem of requiring knowledge of the dielectric properties of a medium has been avoided in U.S. Pat. No. 3,392,384 which discloses a technique for detecting the presence of an object in a medium. In this technique a pair of transmitting and receiving antennas are used to transmit electromagnetic radiation into the medium and receive electromagnetic radiation reflected from the object as well as undesired radiation reflected from the surface of the medium. In this technique the surface reflection is removed by comparing two channels. Although this arrangement does not require knowledge of the dielectric properties of a medium, it is unable to determine the depth of an object. The arrangement merely provides an indication of the presence of an object.

The object of the present invention is thus to provide a simple system for and a method of determining the position of an object in a medium without requiring knowledge of the dielectric properties of the medium or of the object.

SUMMARY OF THE INVENTION

The present invention provides a system for determining the depth of an object having a first permittivity in a medium having a second permittivity substantially different to the permittivity of said object; the system comprising transmitter means for transmitting electromagnetic radiation into said medium for reflection from said object; and receiver means for receiving radiation reflected from said object; said transmitter means being arranged in use to transmit electromagnetic radiation from either one or a plurality of transmission locations along an axis over a surface of said medium adjacent said object; and said receiver means being arranged in use to receive electromagnetic radiation either at one receiver location along said axis from said plurality of transmission locations after reflection from said object, or at a plurality of reception locations along said axis from either said one or said plurality of transmission locations after reflection from said object, the or each said transmission location and the or each reception location being separated by predetermined distances and arranged asymmetrically about a mid point of said axis; the system including measurement means to measure the time taken for electromagnetic radiation to propagate from the or each transmission location to the or each reception location by reflection from said object; and calculation means to calculate the depth of said object in said medium using the measured propagation times and the predetermined distances separating the or each transmission location and the or each reception location.

The present invention also provides a method of determining the depth of an object in a medium having a permittivity substantially different to the permittivity of the object, the method comprising the steps of transmitting electromagnetic radiation into said medium from either one or a plurality of transmission locations along an axis over a surface of said medium adjacent said object; receiving electromagnetic radiation either at one reception location along said axis from said plurality of transmission locations after reflection from said object, or at a plurality of reception locations along said axis from either said one or said plurality of transmission locations after reflection from said object; the or each said transmission location and the or each reception location being arranged asymmetrically along said axis and separated by predetermined distances; measuring the time taken for electromagnetic radiation to propagate from the or each transmission location to the or each reflection location by reflection from said object; and calculating the depth of said object in said medium using the measured propagation times and the predetermined distances separating the or each transmission location and the or each reception location.

The present invention is able to determine the depth of an object which can be made of any material which has a permittivity which differs greatly from that of the medium. The present invention thus has particular application for the detection of objects in the ground where the permittivity of buried objects differs greatly from that of the infill. The buried objects which are detectable vary in extremes from metallic objects such as buried cables to a void such as a buried plastic gas pipe.

The principle of the present invention operates on a triangulation approach in which propagation times of electromagnetic radiation travelling in two different paths is compared in order to eliminate the need for knowledge of the dielectric properties of the medium.

In its simplest form the transmitter means comprises a single transmitter and the receiver means comprises a single receiver. Where there are two or more transmission locations the transmitter can be moveable between the transmission locations in order to transmit electromagnetic radiation therefrom. Where there are two or more reception locations the receiver can be arranged to be moveable between the reception locations in order to receive electromagnetic radiation thereat.

In order to avoid the necessity for moving a transmitter and a receiver, preferably the transmitter means comprises at least one transmitter and the receiver means comprises at least one receiver, the or each transmitter being arranged in use at the or each transmission location and the or each receiver being arranged in use at the or each respective reception location. Thus, the present invention can take the simple form of a single transmitter and two receivers or two transmitters and a single receiver. The transmission and reception locations can be at the same location and the or each transmitter and the or each receiver can be combined as a transceiver.

In accordance with another aspect of the present invention there is provided a system for determining a position on the surface of a medium closest to an object at a depth in said medium, said medium having a permittivity substantially different to the permittivity of said object, the system comprising first transmitter means for transmitting electromagnetic radiation into said medium for reflection by said object; second transmitter means for transmitting electromagnetic radiation into said medium for reflection by said object; first receiver means for receiving radiation transmitted by said first transmitter means and reflected by said object; second receiver means for receiving radiation transmitted by said second transmitter means and reflected by said object; each of said first and second transmitter means being arranged in use to transmit electromagnetic radiation from either one or a plurality of first or second transmission location respectively along an axis over said surface of said medium in the vicinity of said object, and each of said first and second receiver means being arranged in use to receive electromagnetic radiation either at one first or second receiver location respectively along said axis from said plurality of first or second transmission locations respectively after reflection from said object, or at a plurality of first or second reception locations respectively along said axis from either said one or said plurality of first or second transmission locations respectively after reflection from said object, the or each first transmission location and the or each first reception location being separated by predetermined distances and arranged asymmetrically along said axis, the or each second transmission location and the or each second reception location being separated by predetermined distances and arranged asymmetrically along said axis, the or each first transmission location and the or each first reception location being arranged in symmetrically opposed positions about a mid point of said axis to the or each second transmission location and the or each second reception location; the system including measurement means to measure the time taken for the electromagnetic radiation to propagate from the or each first transmission location to the or each first reception location and from the or each second transmission location to the or each second reception location by reflection from said object; and determination means to determine from the measured times and said predetermined distances which direction the or each first transmission location, the or each second transmission location, the or each second transmission location and the or each second reception location should be moved to position said mid point of said axis so that said object lies in a direction extending perpendicularly to said axis from said mid point.

In accordance with a further aspect of the present invention there is provided a method of determining a position on the surface of a medium closest to an object at a depth in said medium, said medium having a permittivity substantially different to the permittivity of said object, the method comprising the steps of: transmitting electromagnetic radiation into said medium from either one or a plurality of first transmission locations and from either one or a plurality of second transmission locations arranged along an axis over the surface of said medium in the vicinity of said object; receiving electromagnetic radiation either at one first reception location along said axis from said plurality of first transmission locations after reflection from said object, or at a plurality of first reception locations along said axis from either said one or said plurality of first transmission locations after reflection from said object; receiving electromagnetic radiation either at one second reception location along said axis from said plurality of second transmission locations after reflection from said object, or at a plurality of second reception locations along said axis from either said one or said plurality of second transmission locations after reflection from said object; the or each first transmission location and the or each first reception location being separated by predetermined distances and arranged asymmetrically along said axis; the or each second transmission location and the or each second reception location being separated by predetermined distances and arranged asymmetrically along said axis; the or each first transmission location and the or each first reception location being arranged in symmetrically opposed positions about a mid point of said axis to the or each second transmission location and the or each second reception location; measuring the time taken for the electromagnetic radiation to propagate from the or each first transmission location to the or each first reception location and from the or each second transmission location to the or each second reception location by reflection from said object; and determining from the measured times and said predetermined distances which direction the or each first transmission locations, the or each first reception location, the or each second transmission location and the or each second reception location should be moved to position said mid point of said axis so that said object lies in a direction extending perpendicularly to said axis from said mid point.

The present invention can thus provide for not only the measurement of the depth of an object in the medium but also for the location of the position of an object relative to the surface of the medium. The transmission and reception locations can be moved until the mid point of the axis on which they lie is directly over the object. In this way the position of objects within the medium can be mapped out.

In many circumstances there is more than one object within the medium and in accordance with one embodiment of the present invention the system is capable of distinguishing multiple objects in the medium by convolving signals received from the receiver means with signals received by the second receiver means to discriminate against signals reflected from objects not lying in a direction extending perpendicularly to the axis from the mid point.

Conveniently, the transmitter means and the receiver means are enclosed within an elongate housing in order to ensure that the transmission and reception locations lie along an axis. A display can be provided in a housing in order to display the depth and/or direction in which the system must be moved in order to lie directly above the object.

There are various arrangements of transmission and reception locations which lie within the scope of the present invention. A simple embodiment of the present invention comprises a single transmission location and two reception locations or a single reception location and two transmission locations. When these are arranged asymmetrically along the axis two different propagation times will be measured and can be used to determine the depth of the object in the medium. More transmission locations and more reception locations can be provided in order to increase the number of propagation paths in order to increase the accuracy of the measurements.

In the system for determining the position of an object relative to the surface of the medium, a binocular technique is used wherein two depth measuring arrangements are provided in symmetrically opposed arrangements about a mid point on the axis. The minimum number of transmission and reception locations required for this is four where two of the reception locations are common to the two depth measuring arrangements, e.g. there are two transmission locations (one for each depth measuring arrangement) and two common reception locations. Alternatively, the system can comprise two transmission locations and three reception locations where only one reception location is common to the two depth measuring arrangements.

In another embodiment of the present invention the transmitter means is arranged to transmit electromagnetic radiation which is frequency modulated using a triangular wave and a mixer is provided to mix transmitted and received signals to provide a signal at frequency proportional to the propagation delay between the two paths in the medium.

BRIEF DESCRIPTION OF THE DRAWINGS

FIG. 14 illustrates the measured signals for the two systems A and B and their combination formed by correlation;

FIG. 15 illustrates practical signals received for system A and system B and their correlation;

FIG. 16 illustrates a depth and position measurement system in accordance with one embodiment of the present invention;

FIG. 17 illustrates a cross section through the system of FIG. 16;

FIG. 18 is a schematic diagram of the electronics of the system in accordance with one embodiment of the present invention.

DESCRIPTION OF THE PREFERRED EMBODIMENTS

The principles behind the present invention will now be described with reference to FIG. 1.

The velocity of propagation of an electromagnetic wave in a medium is measured by the refractive index of a medium. For a practical measurement system it has to be accepted that the refractory index of the medium, e.g. soil, at a particulate site is unknown and that it will vary between sites. Hence the propagation velocity is unknown, and a simple measurement of the time delay on the signal "echo" from a buried target will not by itself provide a useable measurement depth of the target. Using a triangulation system, the need to use the absolute value of the propagation velocity can be eliminated from the problem.

Figure 1:
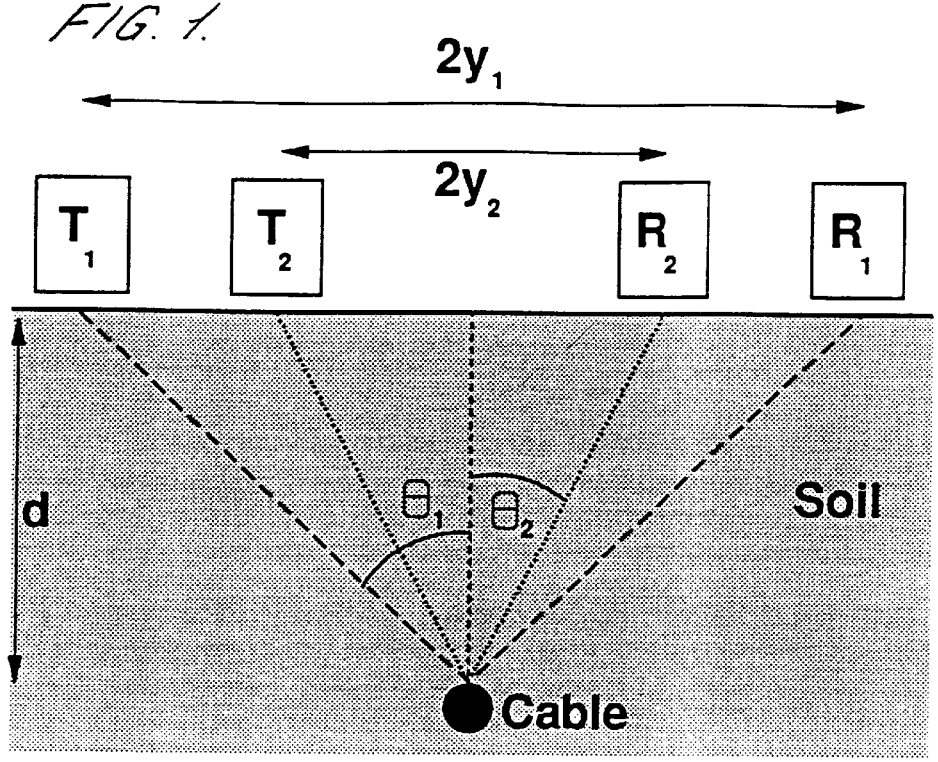
FIG. 1 is a schematic drawing illustrating the principles behind the present invention.

If we consider the cross section of an infill above a target to be as shown in FIG. 1, and assuming that the infill is uniform, then the time taken for the signal to propagate over the distance, 2dsec($\theta_1$), between the transmitter head $T_1$, the cable, and the receiver head $R_1$ is:

$$t_1 = \frac{n\, 2\mathrm{dsec}(\theta_1)}{c}$$

where c is the speed of light in a vacuum and n is the refractive index of the medium. The time delay for the signal to propagate from the transmitter head $T_2$ cable and back to the receiver head $R_2$:

$$t_2 = \frac{n\, 2\mathrm{dsec}(\theta_2)}{c}$$

The ratio of these time delays $\tau_r$ is defined by:

$$\tau_r = \frac{t_1}{t_2} = \frac{\sec(\theta_1)}{\sec(\theta_2)} = \frac{\cos(\theta_2)}{\cos(\theta_1)} = \frac{\dfrac{d}{\sqrt{d^2+y_2^2}}}{\dfrac{d}{\sqrt{d^2+y_1^2}}} = \frac{\sqrt{d^2+y_1^2}}{\sqrt{d^2+y_2^2}}$$

Since $y_1$ and $y_2$ are the known separations of the transmitter and receiver heads, then d is given by:

$$d = \sqrt{\frac{\tau_r^2 y_2^2 - y_1^2}{1-\tau_r^2}} = \sqrt{\frac{t_1^2 y_2^2 - t_2^2 y_1^2}{t_2^2 - t_1^2}} = \sqrt{\frac{(t_1 y_2 + t_2 y_1)(t_1 y_2 - t_2 y_1)}{(t_2+t_1)(t_2-t_1)}}$$

Hence, using the concept of triangulation and the ratio of measured signal delays, the calculation is independent of propagation velocity and relies solely on the geometry of the measurement system. The final calculation is amenable to analysis using a microprocessor once the time delays have been determined. Other combinations of transmitter and receiver positions can be considered which can also be shown to reduce the measurement of target depth to a geometric argument.

Thus in order to detect the depth of depth d of an object in a medium it is merely necessary to measure the propagation times of electromagnetic radiation travelling in two different paths within a medium from a transmission location via reflection from the object to a receiver location.

The transmitted radiation could either be:
1) Continuous wave electromagnetic radiation
2) Frequency modulated continuous wave (FMCW) radiation, or
3) Pulsed radiation.

1(a) Continuous Wave Radiation

Figure 2:
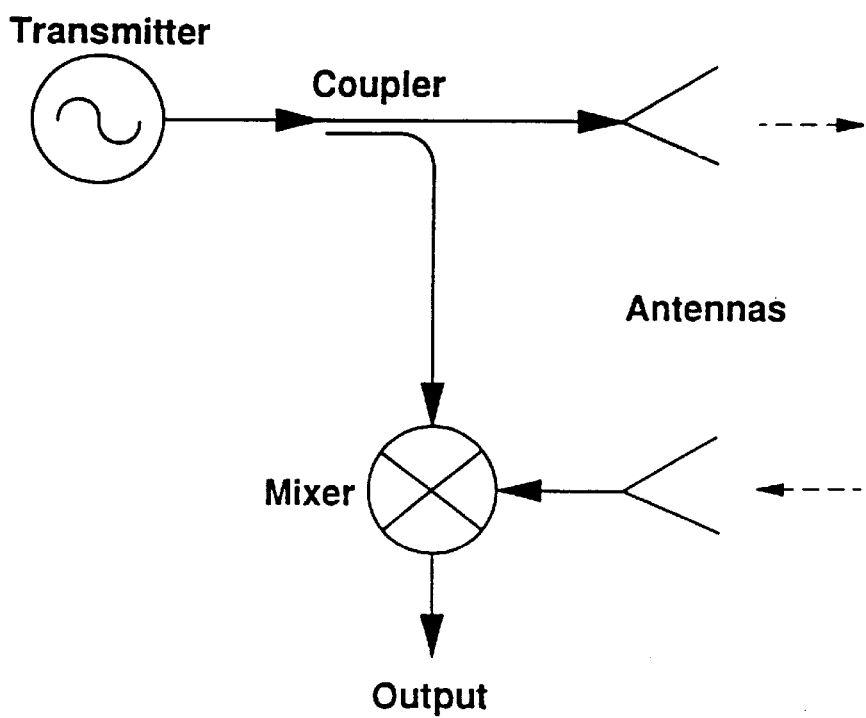
FIG. 2 is a schematic drawing of a continuous wave system in accordance with one embodiment of the present invention.

The basic system diagram for a continuous wave system is shown in FIG. 2. Radiation is generated by a transmitter and coupled to an antenna for transmission into the medium. The output of the transmitter is also coupled to a mixer. The radiation reflected from the object is received by a receiving antenna and mixed by the mixer with the output of the transmitter to generate an output signal.

The transmitter oscillator can either produce a single frequency or a set of fixed frequencies. In either case most of the transmitter power is radiated out from the antenna into the target area, where some is reflected back into the receiving antenna. Part of the transmitted power is used to drive the mixer where part of the transmitted power and the received signal are essentially multiplied together.

1(b) A Single Frequency Continuous Wave System

If the transmitter produces a single frequency, then the received signal is a delayed version of the transmitted signal with a lower amplitude. The delay imposed on the wave in propagating over the distance to the target, r, and back is $\tau_d = 2r/v$ where v is the velocity of propagation ($3 \times 10^8$ m/sec in air). The transmitted, $S_t$, and received, $S_r$, may be written in general forms as:

$$S_t = A\cos(\omega t + \phi_t)$$
$$S_r = B\cos(\omega(t + \tau_d) + \phi_t) = B\cos(\omega t + \phi_t + \omega\tau_d)$$
$$= B\cos(\omega t + \phi t + \Phi_d)$$

respectively. The delay in the signal gives rise to the phase delay $\Phi_2$ in the received signal. The mixer output, $S_o$, contains two major signal components, given by the sum and difference of the arguments to the cosine functions:

$$S_0 = \frac{A \cdot B}{2}[\cos\Phi_d + \cos(2\omega t + 2\phi_t + \Phi_d)]$$

The DC component carries the phase delay, and hence target depth, information. Due to the cyclical nature of the cosine function it is not possible to establish whether the phase delay is $\Phi_d$ or $\phi_d + m\pi$ i.e. whether the target is at a distance of d or $d+m\lambda/2$: $\lambda$ being the signal wavelength. The signal attenuation in soil could possibly provide some discrimination against unwanted returns from deeper than desired targets, as these unwanted returns will be weaker. Using a frequency such that the first half wavelength covers the region to be investigated (2 meters), then the measured refractive index (n'=2.5) a frequency of 30 MHz is needed to set $\lambda/2=2$ meters. However, at such a frequency the soil attenuation is rather too low to reduce returns from deeper unwanted targets significantly.

1(c) A Multiple Continuous Wave System

The Multiple Frequency concept can be illustrated by considering the two frequency case, where the transmitter produces two fixed frequencies. The transmitted signal is then:

$$S_t = A_1 \cos(\omega_1 t + \phi_1) + A_2 \cos(\omega_2 t + \phi_2)$$

The received signal is:

$$S_r = B_1 \cos(\omega_1 t + \phi_1 + \Phi_{d1}) + B_2 \cos(\omega_2 t + \phi_2 + \Phi_{d2})$$

where the phase delays are:

$$\Phi_{d1} = \omega_1 \tau_d$$
$$\Phi_{d2} = \omega_2 \tau_{2d}$$

It is then possible, through the use of a rather more complicated signal mixing system than shown in FIG. 2, to extract a term in the difference between the phase delays:

$$\Delta\Phi_d = \Phi_{d1} - \Phi_{d2} = (\omega_1 - \omega_2) \cdot \tau_d$$

This is in contrast to the single frequency case where the phase term is $\omega \cdot \tau_d$. In the dual tone case two frequencies separated by 30 MHz are needed to measure to a depth of 2 meters. The two frequencies used can be rather higher than 30 MHz, in which case the attenuation of the infill can reduce any signals from targets outside the desired range.

In either the single frequency or the multiple frequency cases the returned signal from the target is at the same frequency as the transmitted signal, but is a phase delayed version of the original signal. Consequently, if there are more than one reflecting targets there is more than one return wave, and each wave has its own phase delay. For two reflecting targets the total return into the receiver at any frequency is:

$$S_r = S_{r1} \cos(\omega t + \phi_t + \Phi_{d1}) + S_{r2} \cos(\omega t + \phi_t + \Phi_{d2})$$

This is simply the addition of two components and the total signal return is:

$$|S_r| = S_{r1}^2 + S_{r2}^2 + 2S_{r1}S_{r2}\cos(\Phi_{d2} - \Phi_{d1})$$

$$\angle S_r = \frac{S_{r1}\sin\Phi_{d1} + S_{r2}\sin\Phi_{d2}}{S_{r1}\cos\Phi_{d1} + S_{r2}\cos\Phi_{d2}}$$

Clearly the resultant signal is still at the frequency $\omega$, but the target information is held in the phase term. Considering $S_{r1}$ as the desired return from the buried cable, the second return produces a change in phase that cannot be predicted without prior knowledge of the relative position of the second target. The error induced by the second target varies between maximum under-measure to maximum over-measure as the separation between the pipe and the second target varies by half of a wavelength of the transmitted signal frequency. If the second target lies within half a wavelength of the primary target, then the return phase indicates a deeper position than the primary. If the separation is between $\lambda/2$ and $\lambda$ the indicated position is too shallow. At 600 MHz the wavelength in the soil samples is approximately 20 cm, and so the measurement error is clearly very dependent on the relative positions of the targets. By taking several measurements along the run of a cable it may be possible to get over this problem.

2. A Frequency Modulated Continuous Wave System

Figure 3:
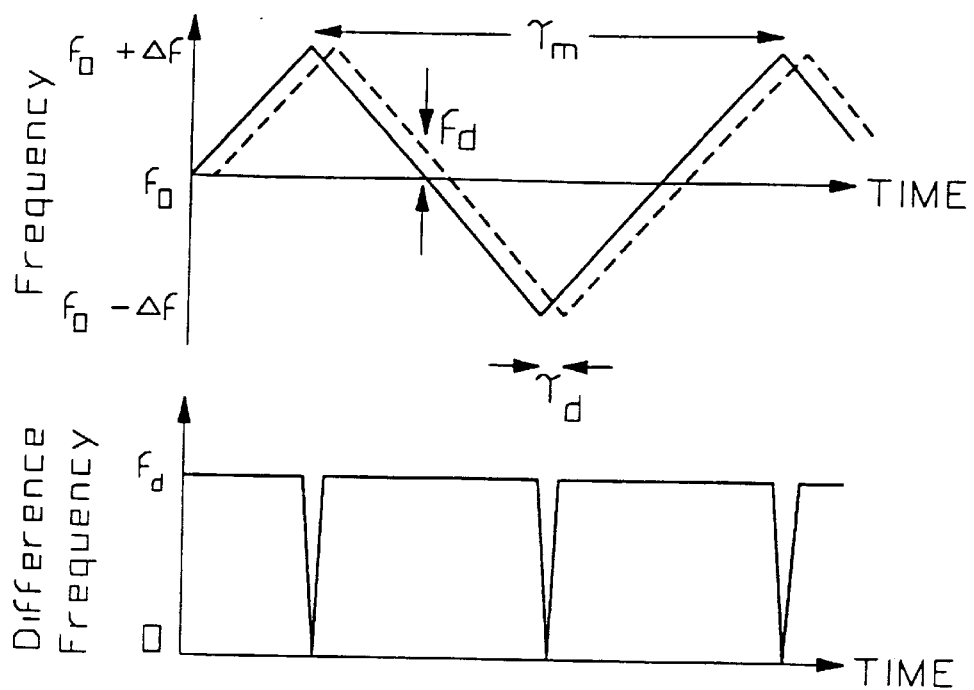
FIG. 3 is a plot of frequency versus time for a transmitted and received signal which is frequency modulated.
Figure 4:
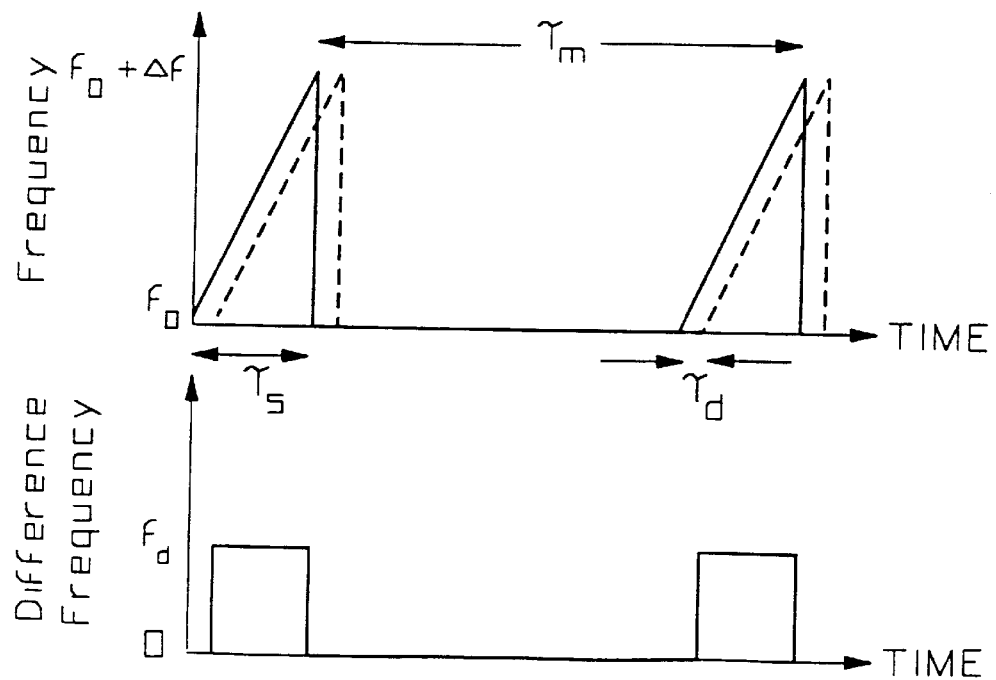
FIG. 4 illustrates a frequency modulated signal where the signal duration and repetition rate can be set independently.
Figure 5A:
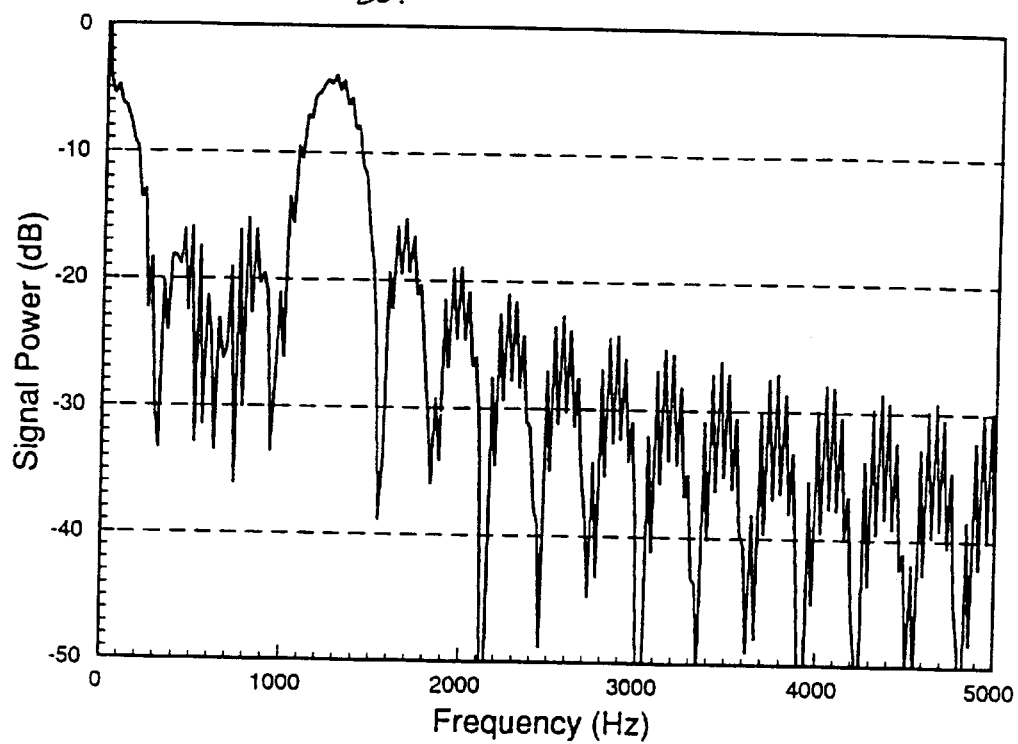
FIG. 5a is a prediction of a dedicated spectrum for a target at a depth of 0.5 meters (1.25 kHz) in a total range of 2 meters (5 kHz) for a signal bandwidth 500 MHz.
Figure 5B:
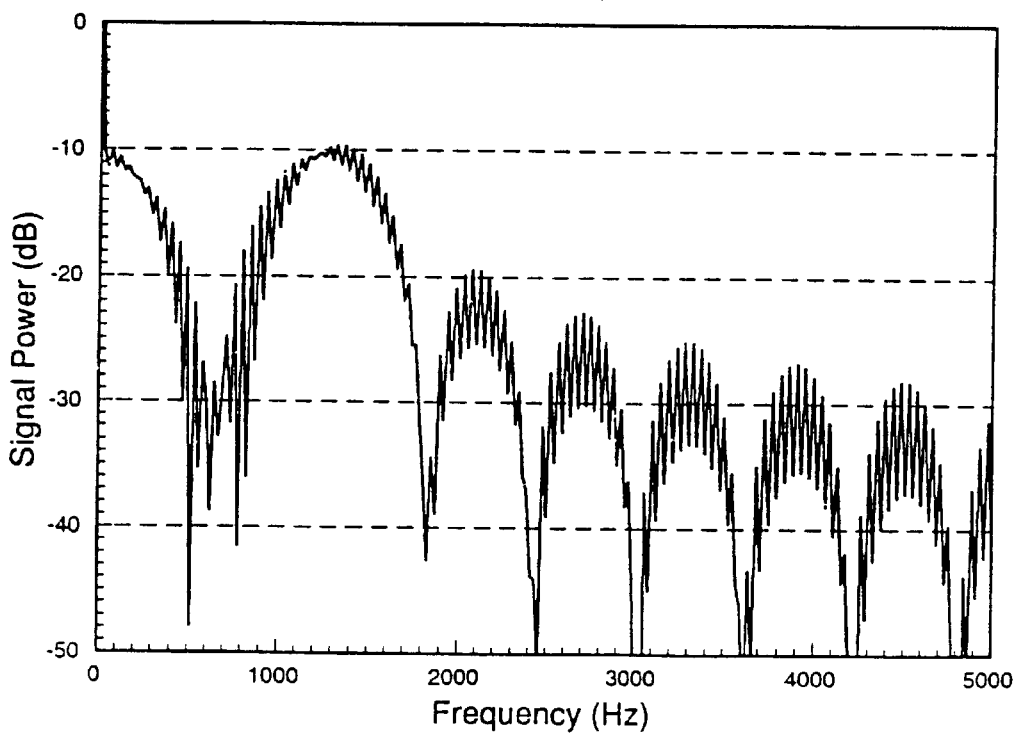
FIG. 5b is a detected spectrum for a target at a depth of 0.5 meters (1.25 kHz) in a total range of 2 meters (5 kHz) for a signal bandwidth of 250 MHz.

In the Frequency Modulated Continuous Wave (FMCW) system the transmitted system is a frequency modulated waveform, such that the instantaneous frequency being transmitted is a function of time. As the signal is modulated there are essentially regular timing marks on the signal, and the delays from many targets can be determined separately allowing the required discrimination between targets. Using a triangular wave modulation so that the transmitter output frequency changes linearly with time, the signal reflected back from the target possesses the same frequency characteristic but is delayed by the time $\tau_d$ taken for the signal to travel from the transmitter to the target and back to the receiver. This is depicted in the upper part of FIG. 3. As the delay in the received signal will increase with increasing distance to the target, this will result in a greater difference frequency. Hence the distance to the target is proportional to the frequency of the mixer output i.e. a different signal, and spectral analysis of this output gives an indication of the distances to many targets. In reality however, each reflecting target does not give rise to a single difference frequency at the mixer output, but rather a finite spectrum due to the finite bandwidth of the system. Considering the modulation scheme shown in FIG. 4, this allows for greater control over the return spectrum than the scheme of FIG. 3 as the signal width, $\tau_s$ and repetition rate, $\tau_m$, are independent. The return spectrum for this modulation scheme can easily be evaluated. A typical spectrum is shown in FIGS. 5a and 5b which illustrate detected signals for targets of depths of up to 2 meters in a soil medium with a refractive index of 2.5–j0.18. This refractive index corresponds to that obtained from soil tests. In order to compensate for the higher attenuation occurring at higher frequencies, the transmitted power is assumed to increase as frequency increase. In all cases the modulation periods are set such that a difference frequency of 5 kHz corresponds to the deepest depth of 2 meters. In this example the target is at a dept of 0.5 meters. The influence that the signal bandwidth ($\Delta f$=total frequency variation of the FM signal) has on this return spectrum is illustrated in FIGS. 5a and 5b, showing the more precise target locating possibilities with higher bandwidth signals. As the soil attenuation and the power requirements of the system suggest operation in the hundreds of MHz region, 500 MHz is probably the greatest bandwidth that can be used.

Figure 6A:
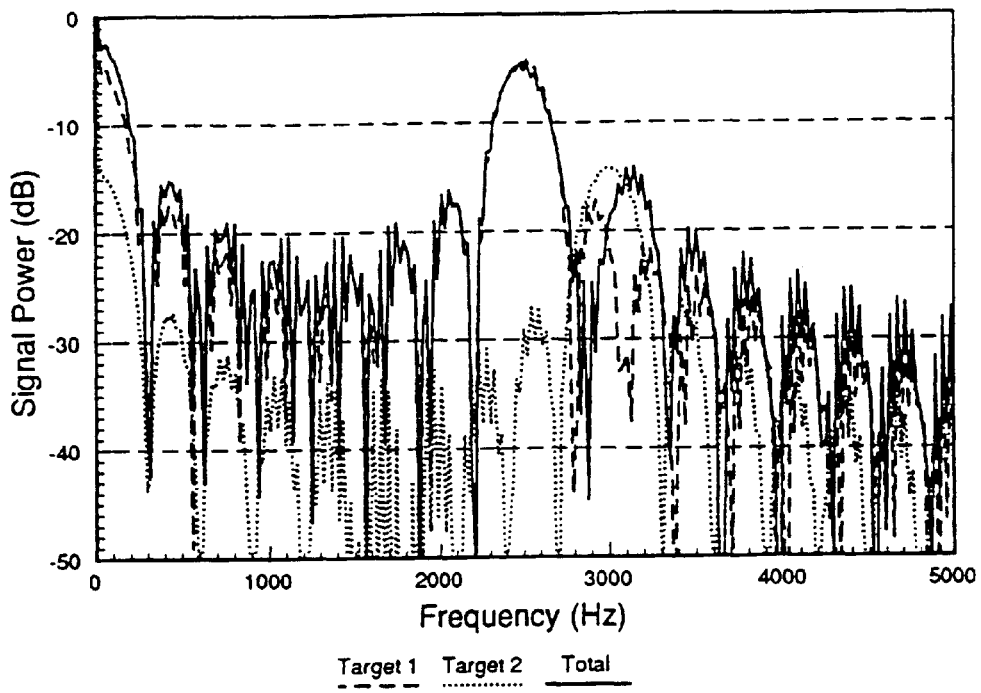
FIG. 6a is a detected spectrum for dual targets for a signal bandwidth of 500 MHz. Target 1 is at a depth of 1 meter and target 2 is at a depth of 1.2 meters.
Figure 6B:
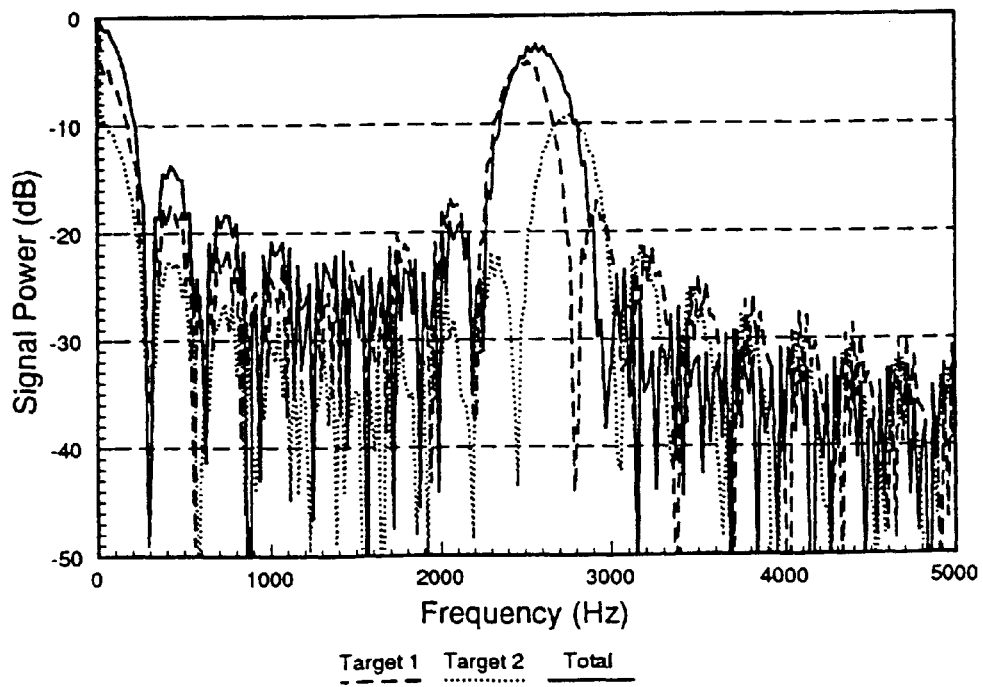
FIG. 6b is a detected spectrum for dual targets for a signal bandwidth of 500 MHz where target 1 is at a depth of 1 meter and target 2 is at a depth of 1.1 meters.

Considering the influence of two targets and the error that this can induce on the determination of safe digging distance, the situation has been examined where target 1 is fixed at a depth of 1 meter, while target 2 is at depths of 1.2 meters and 1.1 meters. The radar cross section of the targets is assumed equal. FIG. 6a illustrates the detected return spectrum when target 2 is at a depth of 1.2 meters and while this produces a significant change in the spectrum at frequencies corresponding to the depth of target 2, the spectrum at the position of the first target is unaltered. Hence the determination of the target depth of target 1 is not affected by the second target 20 cm away.

Where the targets are separated by only 10 cm as shown in FIG. 6b, it can be seen that the combined effect of the two targets has shifted the peak response to a higher frequency, or deeper depth compared with that produced by target 1 alone. Using the peak frequency to measure depth, this will indicate a safe digging distance that is too deep. However, the width of the spectrum at a signal power 3 dB less than the peak is broader than that produced by a single target, and thus there is an indication of a multiple target condition. Hence the correct calculation of using the shallow 3 dB point on the trace for the safe digging depth provides a safe-error.

Figure 7:
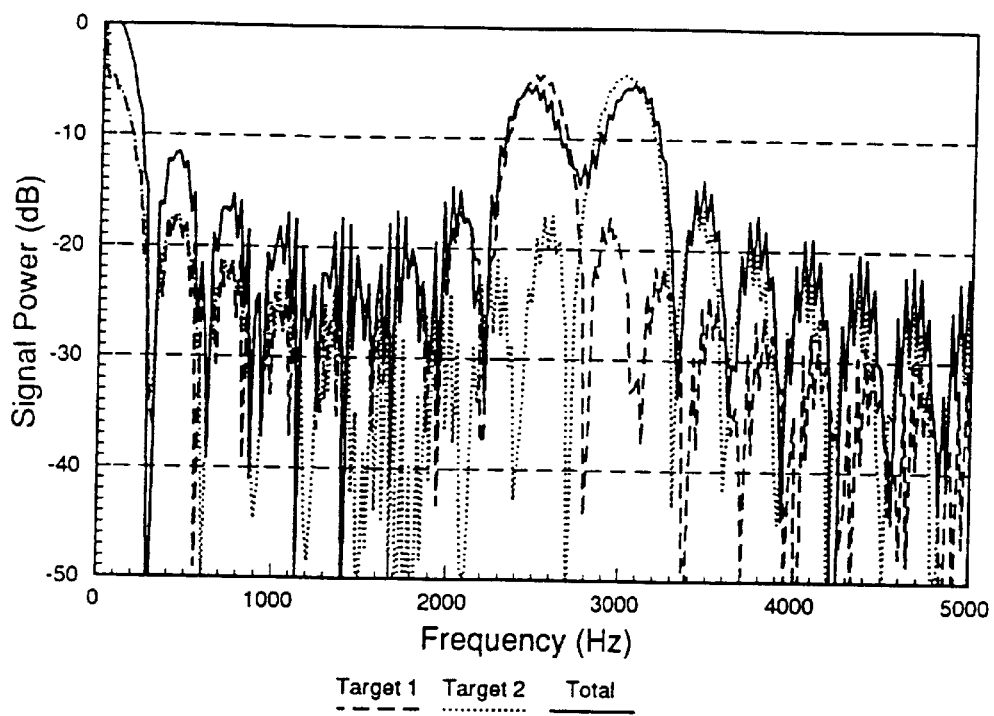
FIG. 7 is a detected spectrum for dual targets for a signal bandwidth of 500 MHz where target 1 is at a depth of 1 meter and target 2 is at a depth of 1.2 meters.

In the cases considered so far the return from target 2 is always lower than that from target 1 as it is further away. In these cases it has also been assumed that the radar cross sections of the targets are equal. The case where the radar cross section for target 2 is 10 times greater than that of target 1 is shown in FIG. 7 for a target depth of 1 meter and 1.2 meters. Clearly, from this response the positions of the two targets can be resolved and the system can correctly identify the safe digging depth.

3. The Pulsed System

Figure 8:
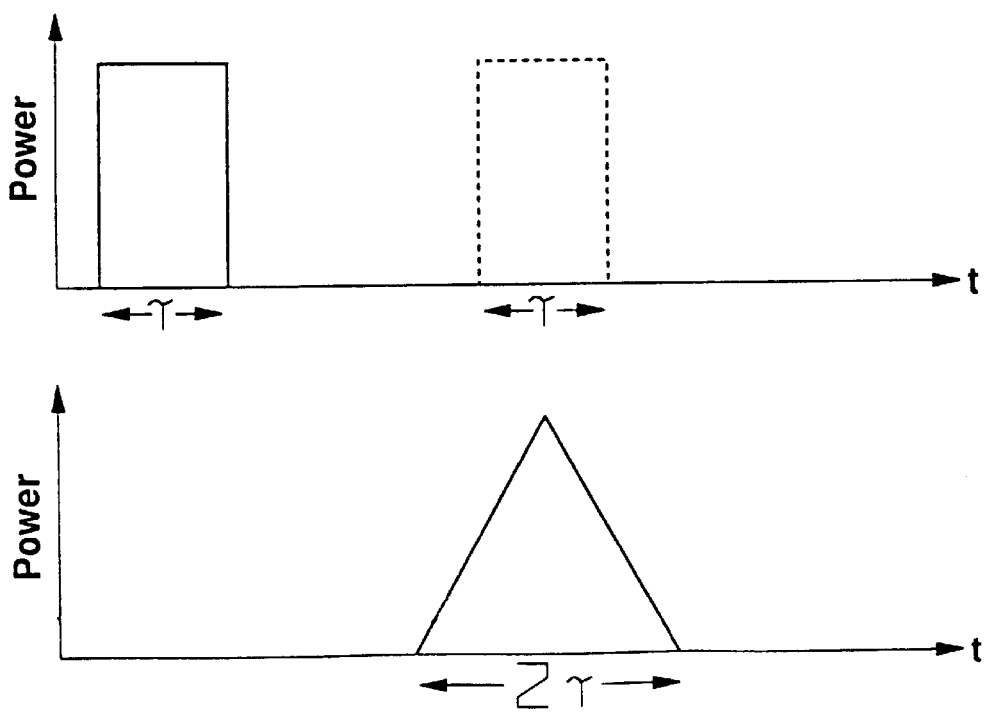
FIG. 8 is an illustration of the ideal transmitted and received waveforms for transmitted pulses of radiation and their correlation.

The use of pulsed electromagnetic radiation is traditionally used in-radar and sonar systems. A pulse of electromagnetic radiation is transmitted and the delay between transmission and reception of the echo from the target is timed. The ideal waveforms are represented in FIG. 8, showing the signal power of the transmitted and received pulses. In reality, these pulses are modulated and demodulated onto a carrier signal, but for simplicity the pulse envelopes can be considered to be perfectly rectangular.

A correlation detection system is generally applied, where a sample of the transmitted pulse is taken and then delayed by a time $t_d$ before being added or multiplied with the received pulse. The resulting output is also shown in FIG. 8, and is a maximum where the delay imposed on the sample is equal to the delay caused by the pulse travelling to the target and back, $\tau_d$. The advantage in such a detection/measurement system is in the sharp indication of $\tau_d$, given that the delay time $t_d$ can be accurately controlled and set. The simplest implementation of this system is to add the reflected and delayed signals and detect the peak response.

For determining the safety in distance, the measurement precision and the influence of interfering returns from other reflecting objects need to be considered. The half power points on the correlation waveform are separated in time by the pulse width, $\tau$. While the peak return could be more clearly determined, in a real bandwidth limited system the pulses will not be exactly rectangular but have finite slopes and ripple. The half power width provides us with a useful estimate of the pulse width needed for a given measurement precision. To determine the target position to within 10 cm in soil of refractive index 2.5, the pulse width should be $2 \times 10$ cm$\times 2.5/(3 \times 10^8$ m/sec$)=1.67$ nsec.

Figure 9:
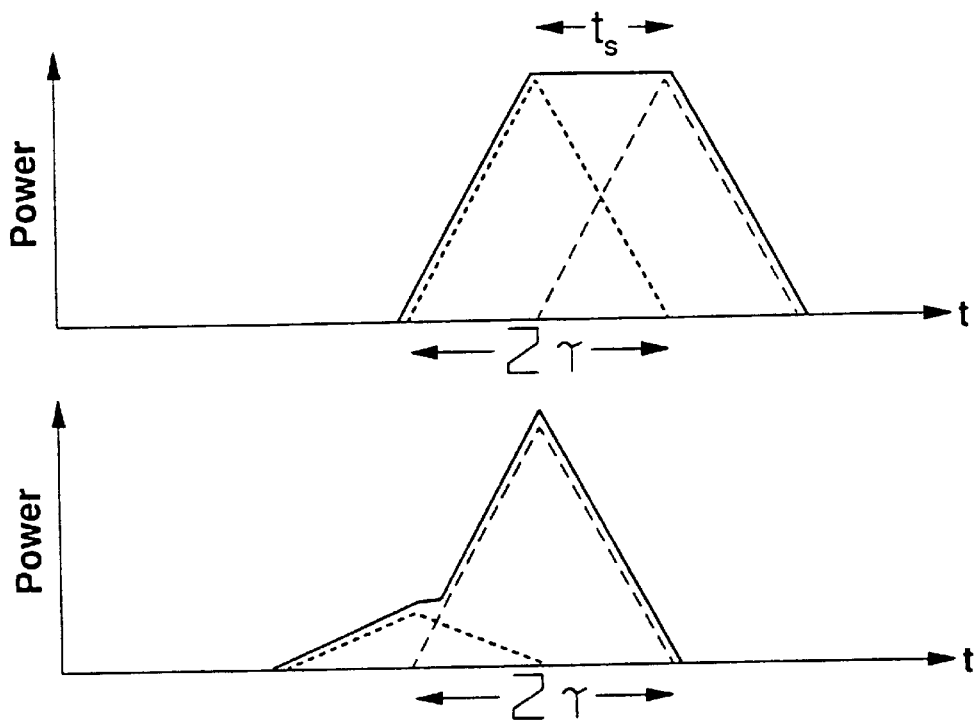
FIG. 9 illustrates the correlation response for two closely spaced targets in a pulsed transmission system.

If there is secondary target close to the cable, then assuming that both targets given equal returned power, the resolution of the system can be determined from the upper traces of FIG. 9. The resolution is usually determined by requiring the half power points of the individual returns to coincide. The total return is then flat at its peak. If the targets have a greater separation then there will be a minimum between two peaks, if lesser separation then there is only a single peak. The resolution in terms of time separation is then $t_s=\tau$, so to resolve targets 20 cm apart a pulse width of 3.33 nsec is needed. It is however more likely that the returns will be of different powers, and typically the soil attenuation will reduce the return from the further target leaving the return from the first object as the major return. The worst case is that the further target return is dominant, as shown in the lower trace of FIG. 9. In that case the pulse width needs to be virtually halved to provide two clearly discernible peaks.

Figure 10:
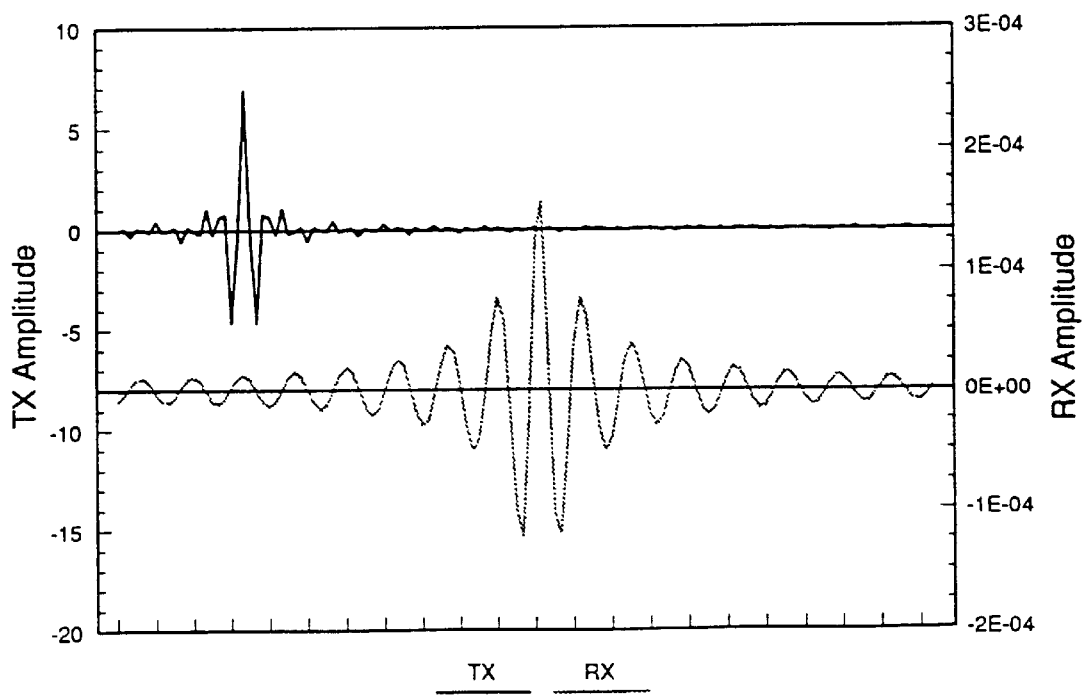
FIG. 10 illustrates the waveforms for pulsed tone signals showing the transmitted (TX) signal and received (RX) signal after reflection from a target at a depth of meters.

A pulsed system will, in reality, send out a pulsed tone, which contains many frequency components. It has already been shown that frequencies around 500 Mhz are attractive because of the power needed to overcome soil attenuation. Considering a monocycle pulse at 500 MHz, then the pulse width is 2 nsec. FIG. 10 shows the waveform of such a transmitted (TX) pulse when its bandwidth is limited to the band used in the FMCW examples (i.e. 250 MHz–750

MHz). The received (RX) waveform from a target buried 2 meters in soil is also shown, and is clearly distorted. The main feature to note is that the greater attenuation of the higher frequency components has resulted in the received pulse being spread out and containing mainly the lower frequency components of the original pulse. This spreading of the pulse will lead to less precise determination of the target position.

The convolution envelope of the TX and RX signals is not that different from the RX signal itself in this case. In detecting the target position using correlation the TX signal will be delayed by discrete steps using current technology rather than in a continuous manner. In order to identify the peak the system may require at least three or four samples per half period of the correlation waveform, i.e. discrete steps of 0.5 nsec. In measuring to a depth of 2 meters the total delay is about 35 nsec, and so 70 delay states are needed along with a suitable switching network.

Figure 11:
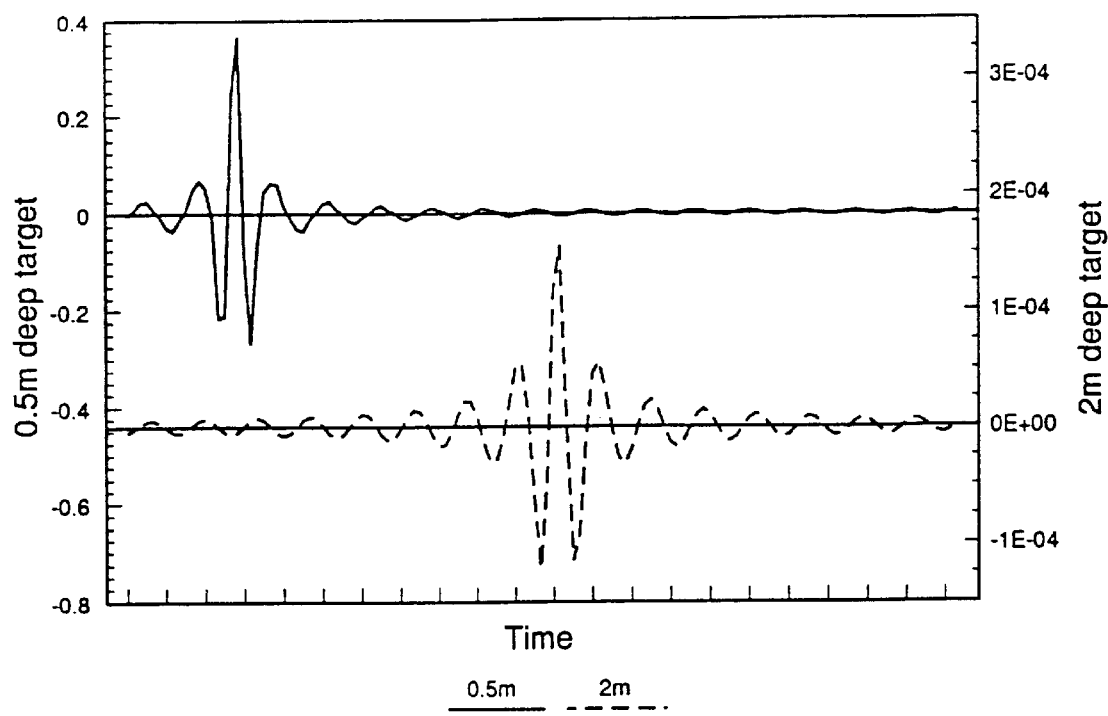
FIG. 11 illustrates the convolution response of targets at depths of 0.5 meters and 2 meters.

It should be possible, by appropriate amplification and filtering to distort the transmitted pulse such that the received pulse appears more like the original undistorted pulse, and gives a sharp correlation response. Essentially this involves amplifying the higher frequency components more than the lower frequency components. FIG. 11 shows the convolution response from targets at depths of 0.5 meters and 2 meters. Clearly the distortion, or spreading, of the signals depends on the depth of the target. Thus it is necessary to produce a predistorted circuit where the distortion could be controlled as deeper targets are sought.

All three techniques using continuous waves, frequency modulation and pulses can be used for detecting the depth of an object using the triangulation approach. However, the triangulation approach does not allow for the determination of the position of an object relative to the surface and does not allow for the easy discrimination of multiple objects. In practice, when trying to detect objects in the ground, the infill structure is far from homogeneous and will contain a multitude of potential reflectors in addition to the target of interest. This clutter will cause confusion in identifying the target of interest and hence measuring its depth. Further problems are also likely to be due to the possible presence of other targets close by.

In order to reduce the clutter and confusion due to other targets in accordance with one aspect of the present invention a binocular measurement system concentrates the measurement onto the target of interest. This technique operates by using two of the depth measurement arrangements arranged along an axis in symmetrically opposed positions.

Figure 12A:
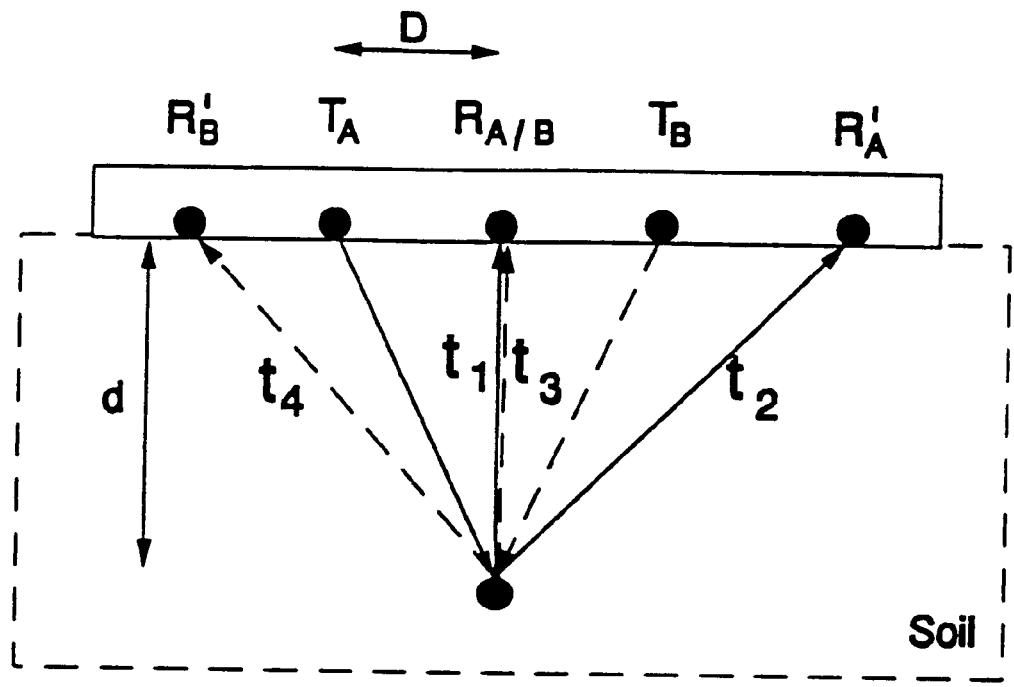
FIG. 12a illustrates one configuration for detecting both the depth and position of an object relative to the surface in accordance with one embodiment of the present invention.
Figure 12B:
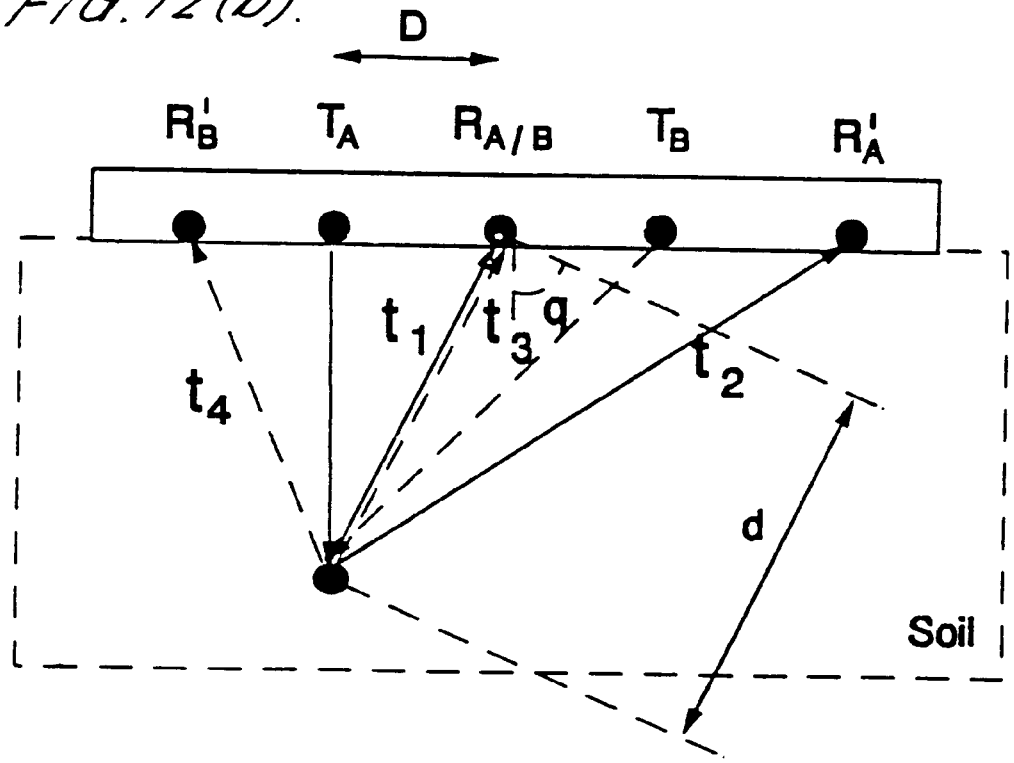
FIG. 12b illustrates the same embodiment as FIG. 13a for a different target offset from a direction perpendicular to the mid point of the transmitter/receiver array.

FIGS. 12a and 12b illustrates an arrangement which can provide two separate measurements of the depth of an object in a soil medium. The binocular measurement system comprises a depth measuring system A comprising transmitted $T_A$, the receiver $R_A$ and a common receiver $R_{A/B}$. The depth measuring system B comprises the transmitter $T_B$, the receiver $R_B$ and a common receiver $R_{A/B}$. In the depth measuring system A the differences in the propagation times $T_1$ and $T_2$ is used to determined a first depth and in the depth measuring system B the propagation times $T_1$ and $T_4$ are used to determine a second depth. If these two depth measurements are equal as shown in FIG. 12a the transmitter and receiver array system is positioned such that the mid point of the axis lies directly above the object. If on the other hand the depths measured by systems A and B are different as shown in FIG. 12b, the transmitter/receiver array needs to be moved to position its mid point (represented by the common receiver $R_{A/B}$ in the arrangements of FIGS. 12a and 12b) above the object.

Thus the depth measurements from systems A and B can be used to provide instructions in the form of an appropriate display to an operator to move the array in a particular direction until the mid point is positioned directly above the object.

Ideally the reflected signals from a target of interest will be of similar magnitude and fine adjustments can therefore be made by the operator following the displayed instructions until the signals are similar. This automatic homing technique also enables the system to be used to map an area of ground for buried targets with the position of the measurement head indicating when it is directly above the target and the depth measurement indicating how deep it is buried.

The binocular measurement system is further able to discriminate between targets by the convolution of received waveforms which use similar but different paths to measure the target depth, and hence filter reflections not obtained from targets directly beneath the mid point of the measurement array.

Figure 13:
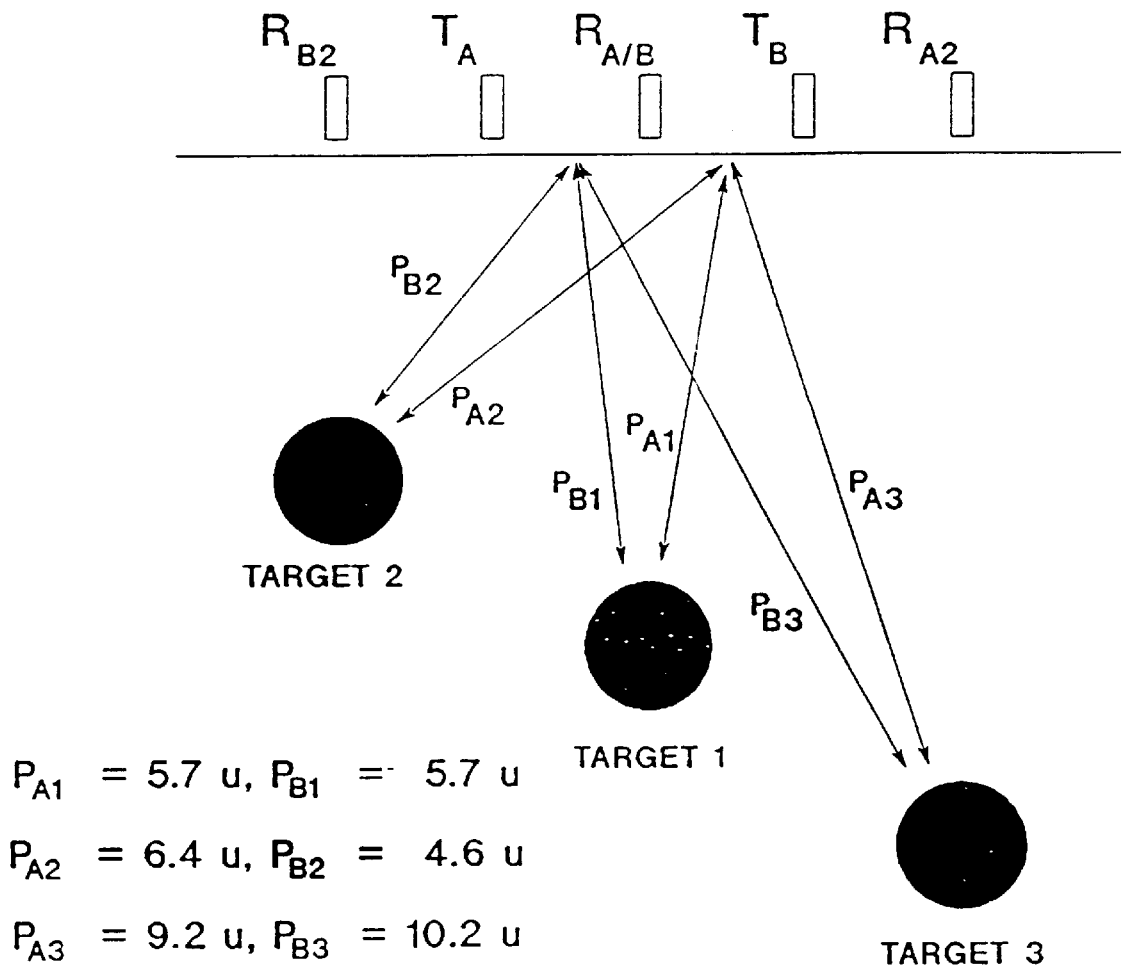
FIG. 13 illustrates the relationship of multiple targets for a transmitter/receiver array in accordance with one embodiment of the present invention.

FIG. 13 illustrates the situation when there are three targets arranged at different depths at different positions underneath the measurement array. The systems A and B will provide two different sets of measured depths for the three targets, as shown in the upper two traces of FIG. 14. By convolving these two measurements only the measurements of depth for targets directly below the mid point of the array will provide a correlation signal. Thus by convolving the signals output on the systems A and B signals from targets away from the mid point can be discriminated against.

FIG. 15 illustrates the response from a practical measurement system which produces less clear measurements of the positions of the targets. Although the convolution does not result in the complete removal of signals from targets off the mid point, they are significantly attenuated.

In this system the convolution process can be applied to the receiver waveforms before they are used for depth measurement instead of using the results of the individual depth measurements. This approach introduces the filtering process earlier in the system and thus simplifies the measurement calculations.

Thus the binocular measurement system in accordance with this embodiment of this invention can provide either an indication of the direction in which the measurement heads should be moved or, or in addition, it can discriminate against multiple targets by the step of convolving the outputs of the receivers of systems A and B.

FIG. 16 illustrates a practical arrangement for a depth measurement system in accordance with one embodiment of the present invention. An array of three receivers Rx and two transmitters Tx are provided as a symmetrical linear array in a housing 10 with a display 20 which can display not only depth of an object but also the direction in which the housing should be moved in order to be directly above a target.

Although FIG. 16 illustrates the practical system comprising three receivers and two transmitters, the same antennas could be used for UHF signal transmission and reception and thus in its simplest form two transmitters/receivers could be used and a single receiver at the mid point. The flexibility to switch the heads from either transmitter or receiver circuits provides the basis for more sophisticated filtering systems to further concentrate the measurement onto the target of interest.

Preferably the unit should be positioned a short distance above the ground's surface, using the air-ground interface to concentrate the transmitted wave. Such a distance can be provided by a spacer which can also act as a spacer 30 as shown in FIG. 17 which can also act as a protective covering. A two element array 40 can provide the directional characteristics required and can reduce cross-talk between adjacent units. The antenna elements 40 are contained within the housing 10 and are separated from the electronics 50 and power supplies 60 by a UHF absorber 70.

FIG. 18 illustrates schematically the electronics in accordance with one embodiment of the present invention. The electronics is divided into two main sub-sections: the UHF sub-system 100 and the signal processing sub-system 200. The UHF sub-system includes a voltage controlled oscillator 110, an amplifier 120 to amplify the output of the voltage controlled oscillator and an antenna to receive and transmit the UHF signal. The output of the amplifier 120 is also input to a mixer 140. A receiving antenna 150 receives the reflected UHF signal and this is amplified and filtered in the amplifier and filter 160 before being passed to the mixer 140 to be mixed with the output of the UHF oscillator 110. The output of the mixer 140 is passed to an amplifier and filter 170 and is digitised in an analogue-to-digital converter 180. The digitised signal from the analogue-to-digital converter 180 is then passed to the signal processing sub-system 200.

The signalling processing sub-system 200 comprises a digital signal processor 210, a general purpose microprocessor 220 and the LCD display 20.

Figure 19:
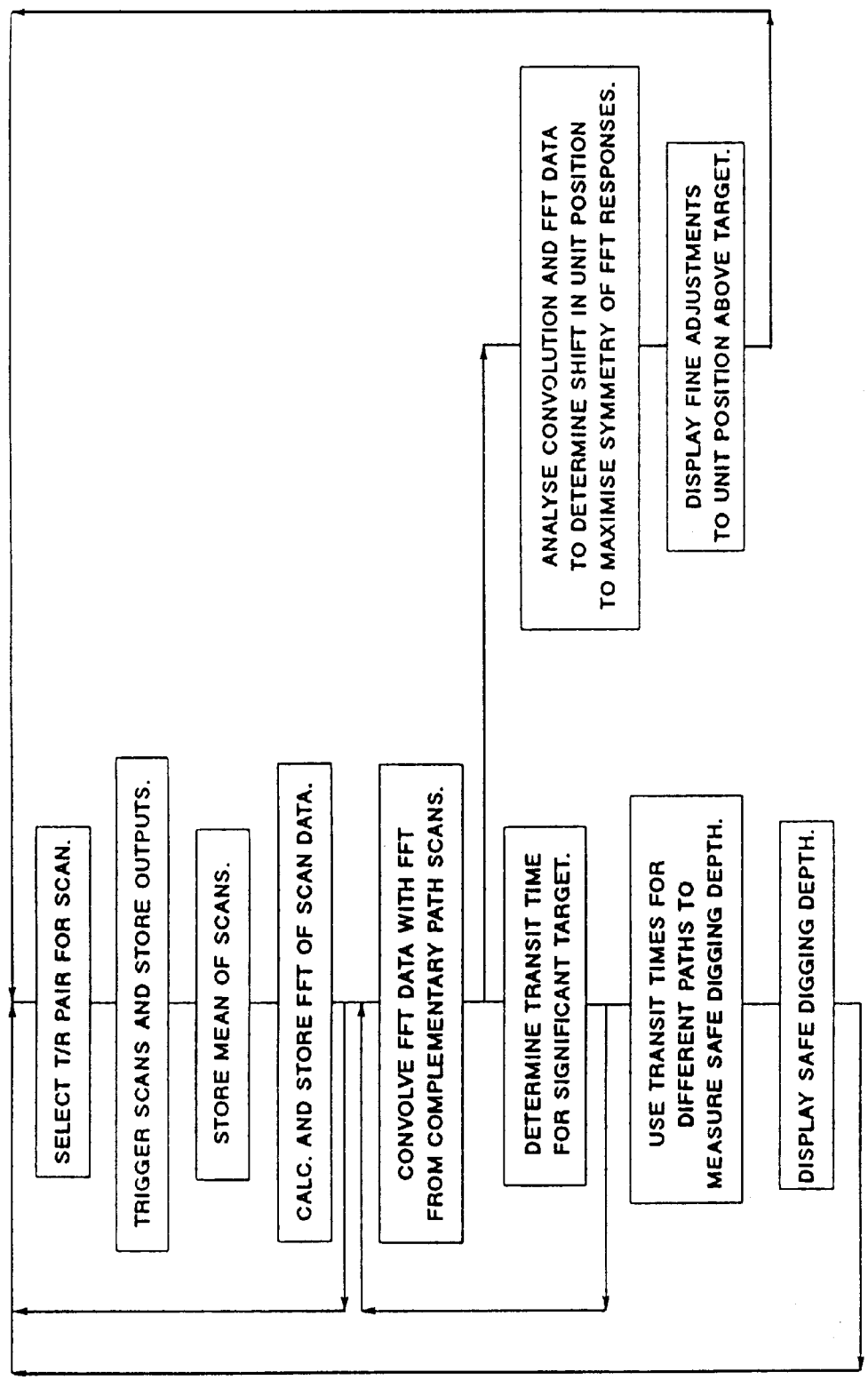
FIG. 19 is a flow diagram of the signal processing steps carried out in accordance with one embodiment of the present invention.

FIG. 19 illustrates the signal processing steps involved in a frequency modulated continuous wave technique in accordance with one embodiment of the present invention. In the first step the transmitter/receiver pair are selected for a scan. The scan is then triggered and the output stored. In order to increase the signal to noise ratio the mean of the scan is stored. The Fast Fourier Transform (FFT) of the scanned data is calculated and stored. This FFT data is then convolved with the FFT data from complimentary part scans and the result can either be used to determine the direction in which to shift the unit to maximise symmetry of the FFT responses whereupon this is displayed or the transit time for a significant target is determined in order to measure safe digging depth for display.

Although the present invention has been described hereinabove with reference to embodiments, the present invention is not limited to these embodiments and it will be understood by a skilled person that the present invention includes modifications which lie within the scope of the claims.

What is claimed:

1. A system for determining the depth of an object having a first permittivity in a medium having a second permittivity substantially different to the permittivity of said object; the system comprising first transmitter means for transmitting electromagnetic radiation into said medium for reflection from said object; and first receiver means for receiving radiation reflected from said object; said first transmitter means being arranged in use to transmit electromagnetic radiation from either one or a plurality of first transmission locations along an axis over a surface of said medium adjacent said object; and said first receiver means being arranged in use to receive electromagnetic radiation either at one first receiver location along said axis from said plurality of first transmission locations after reflection from said object, or at a plurality of first reception locations along said axis from either said one or said plurality of first transmission locations after reflection from said object, the said first transmission location or each said first transmission location and the first reception location or each first reception location being separated by predetermined distances and arranged asymmetrically about a mid point of said axis; the system including measurement means to measure the time taken for electromagnetic radiation to propagate from the first transmission location or each first transmission location to the first reception location or each first reception location by reflection from said object; and calculation means to calculate the depth of said object in said medium using the measured propagation times and the predetermined distances separating the first transmission location or each first transmission location and the first reception location or each first reception location, the system further including second transmitter means like said first transmitter means and second receiver means like said first receiver means, said second transmitter means and said second receiver means being arranged in use to transmit or receive electromagnetic radiation respectively at one or a plurality of second transmission locations and second reception locations respectively along said axis in a like manner to said first transmitter means and said first receiver means; the first transmission location or each first transmission location, the second transmission location or each second transmission location, the first reception location or each first reception location and the second reception location or each second reception location forming a symmetrical arrangement about said mid point of said axis; said measurement means being adapted to measure the time taken for the electromagnetic radiation to propagate from the second transmission location or each second transmission location to the second reception location or each second reception location by reflection from said object; said calculation means being adapted to calculate a first depth using the measured propagation times for electromagnetic radiation traveling from the first transmission location or each first transmission location to the first reception location or each first reception location and a second depth using the measured propagation times for electromagnet radiation travelling from the second transmission location or each second transmission location to the second reception location or each second reception location, the system including comparison means to compare said first depth with said second depth to determine which direction the first transmission location or each first transmission location, the first reception location or each first reception location, the second transmission location or each second transmission location and the second reception location or each second reception location should be moved to position said mid point of said axis so that said object lies in a direction extending perpendicularly to said axis from said mid point.

2. A system as claimed in claim 1 wherein said first transmitter means comprises a transmitter and said first receiver means comprises a receiver, transmitter being adapted to be moveable between said first transmission location and said first receiver being adapted to be moveable between said first reception locations.

3. A system as claimed in claim 1 wherein said first transmitter means comprises at least one transmitter, and said first receiver means comprises at least one receiver, the transmitter or each transmitter being arranged in use at the respective first transmission location or each respective first transmission location, and the receiver or each receiver being arranged in use at the respective reception location or each respective reception location.

4. A system as claimed in claim 1 capable of distinguishing multiple objects in said medium including convolution means to convolve signals received by said first receiver means with signals received by said second receiver means to discriminate against signals reflected from objects not lying in a direction extending perpendicular to said axis from said mid point.

5. A system as claimed in claim 1 including an elongate housing to house said transmitter means and said receiver means.

6. A system as claimed in claim 1 including an elongate housing to house said first transmitter means, said first receiver means, said second transmitter means and said second receiver means.

7. A system as claimed in claim 1 including display means to display the depth calculated by said calculation means.

8. A system as claimed in claim 1 including display means to display an indication of the direction in which the first transmission location or each first transmission location, the first reception location or each first reception location, the second transmission location or each second transmission location, and the second reception location or each second reception location should be moved.

9. A system as claimed in claim 1 wherein said transmitter means is arranged to transmit pulses of electromagnetic radiation, said measurement means being arranged to correlate transmitted and received pulses to measure the propagation times.

10. A system as claimed in claim 1 wherein said second transmitter means is arranged to transmit pulses of electromagnetic radiation, said measurement means being arranged to correlate transmitted and received pulses to measure the propagation delay.

11. A system as claimed in claim 1 wherein said first transmitter means is arranged to transmit electromagnetic radiation which is frequency modulated, said measurement means including a mixer to mix transmitted and received signals to provide a signal at a frequency proportional to the propagation delay.

12. A system as claimed in claim 1 wherein said second transmitter means is arranged to transmit electromagnetic radiation which is frequency modulated, said measurement means including a mixer to mix transmitted and received signals to provide a signal at a frequency proportional to the propagation delay.

13. A system as claimed in claim 1 wherein said first transmitter means and said first receiver means comprise a plurality of common transceivers.

14. A system as claimed in claim 1 wherein said first transmitter means comprises a transmitter and said first receiver means comprises two receivers.

15. A system as claimed in claim 1 wherein said second transmitter means comprises a transmitter and said second receiver means comprises two receivers.

16. A system as claimed in claim 1 wherein said first transmitter means comprises two transmitters and said first receiver means comprises a receiver.

17. A system as claimed in claim 1 wherein said second transmitter means comprises two transmitters and said second receiver means comprises a receiver.

18. A system as claimed in claim 1 wherein said first transmitter means comprises a transmitter, said first receiver means comprises two receivers, said second receiver means comprises a second transmitter and said second receiver means comprises a further receiver and one of said receivers of said first receiver means.

19. A system for determining a position on the surface of a medium closest to an object at a depth in said medium, said medium having permittivity substantially different to the permittivity of said object, the system comprising first transmitter means for transmitting electromagnetic radiation into said medium for reflection by said object; second transmitter means for transmitting electromagnetic radiation into said medium for reflection by said object; first receiver means for receiving radiation transmitted by said first transmitter means and reflected by said object; second receiver means for receiving radiation transmitted by said second transmitter means and reflected by said object; each of said first and second transmitter means being arranged in use to transmit electromagnetic radiation from either one or a plurality of first or second transmission locations respectively along an axis over said surface of said medium in the vicinity of said object, and each of said first and second receiver means being arranged in use to receive electromagnetic radiation either at one first or second receiver location respectively along said axis from said plurality of first or second transmission locations respectively after reflection from said object, or at a plurality of first or second reception locations respectively along said axis from either said one or said plurality of first or second transmission locations respectively after reflection from said object, the first transmission location or each first transmission location and the first reception location or each first reception location being separated by predetermined distances and arranged asymmetrically along said axis, the second transmission location or each second transmission location and the second reception location or each second reception location being separated by predetermined distances and arranged asymmetrically along said axis, the first transmission location or each first transmission location and the first reception location or each first reception location being arranged in symmetrically opposed positions about a mid point of said axis to the second transmission location or each second transmission location and the second reception location or each second reception location; the system including measurement means to measure the time taken for the electromagnetic radiation to propagate from the first transmission location or each first transmission location to the first reception location or each first reception location and from the second transmission location or each second transmission location to the second reception location or each second reception location by reflection from said object; and determination means to determine from the measured times which direction the first transmission location or each first transmission location, the first reception location or each first reception location, the second transmission location or each second transmission location and the second reception location or each second reception location should be moved to position said mid point of said axis so that said object lies in a direction extending perpendicularly to said axis from said mid point.

20. A system as claimed in claim 19 wherein said first transmitter means comprises a first transmitter, said first receiver means comprises two receivers, said second transmitter means comprises a second transmitter, and said second receiver means comprises two receivers at least one of which is common to said first and second receiver means.

21. A system as claimed in claim 19 including a housing for said first and second transmitter means and said first and second receiver means.

22. A system as claimed in claim 19 including a display to display the determined direction to be moved.

23. A method of determining the depth of an object in a medium having a permittivity substantially different to the permittivity of the object, the method comprising the steps of transmitting electromagnetic radiation into said medium from either one or a plurality of first transmission locations along an axis over a surface of said medium adjacent said object; receiving electromagnetic radiation either at one first reception location along said axis from either said one or said plurality of first transmission locations after reflection from said object, or at a plurality of first reception locations along said axis from either said one or said plurality of first transmission locations after reflection from said object; the first transmission location or each said first transmission location and the first reception location or each first reception location being arranged asymmetrically along said axis and separated by predetermined distances; measuring the time taken for electromagnetic radiation to propagate from the first transmission location or each first transmission location to the first reception location or each first reflection location by reflection from said object; and calculating the depth of said object in said medium using the measured propagation times and the predetermined distances separating the first transmission location or each first transmission location and the first reception location or each first reception location, the method further including the steps of transmitting electromagnetic radiation into said medium from either one or a plurality of second transmission locations along said axis; receiving electromagnetic radiation either at one second reception location along said axis from said plurality of second transmission locations after reflection from said object, or at a plurality of second reception locations along said axis from either said one or said plurality of second transmission locations after reflection from said object; the first transmission or each first transmission location and the first reception location or each first reception location being arranged in symmetrically opposed positions about a mid point of said axis to the second transmission location or each second transmission location and the second reception location or each second reception location; the step of measuring including the step of measuring the time taken for electromagnetic radiation to propagate from the second transmission location or each second transmission location to the second reception location or each second reception location; the step of calculating including the step of calculating a second depth using the measured propagation times for electromagnetic radiation propagating from the second transmission location or each second transmission location to the second reception location or each second reception location; comparing the calculated depths to determine which direction the first transmission location or each first transmission location, the first reception location or each first reception location, the second transmission location or each second transmission location and the second reception location or each second reception location should be moved to position said mid point of said axis so that said object lies in a direction extending perpendicular to said axis from said mid point.

24. A method as claimed in claim 23 wherein said step of transmitting includes the step of moving a first transmitter from a first of said plurality of first transmission locations to others of said plurality of first transmission locations, and said measuring step includes the step of measuring the propagation time from each first transmission location.

25. A method as claimed in claim 23 wherein said step of receiving includes the step of moving a first receiver from a first of said plurality of first reception locations to others of said plurality of first reception locations, and said measuring step includes the step of measuring the propagation times to each said first reception location.

26. A method as claimed in claim 23 capable of distinguishing multiple objects in said medium, the method including the step of convolving signals received at the first reception location or each first reception location with signals received at the second reception location or each second reception location to discriminate against signals reflected from objects not lying in a direction extending perpendicularly to said axis from said mid point.

27. A method as claimed in claim 23 wherein the step of transmitting comprises the step of transmitting pulses of electromagnetic radiation into said medium, and the step of measuring comprises the step of correlating transmitted and received pluses to measure the propagation times.

28. A method as claimed in claim 23 wherein the step of transmitting comprises the step of transmitting electromagnetic radiation which is frequency modulated, and the step of measuring comprises the step of mixing transmitted and received proportional to propagation delay.

29. A method of determining a position on the surface of a medium closest to an object at a depth in said medium, said medium having a permittivity substantially different to the permittivity of said object, the method comprising the steps of: transmitting electromagnetic radiation into said medium from either one or a plurality of first transmission locations and from either one of a plurality of second transmission locations arranged along an axis over the surface of said medium i the vicinity of said object; receiving electromagnetic radiation either at one first reception location along said axis from said plurality of first transmission locations after reflection from said object, or at a plurality of first reception locations along said axis from either said one or said plurality of first transmission locations after reflection from said object; receiving electromagnetic radiation either at one second reception location along said axis from said plurality of second transmission locations after reflection from said object, or at a plurality of second reception locations along said axis from either said one or said plurality of second transmission locations after reflection from said object; the first transmission location or each first transmission location and the first reception location or each first reception location being separated by predetermined distances and arranged asymmetrically along said axis; the second transmission location or each second transmission location and the second reception means or each second reception location being separated by predetermined distances and arranged asymmetrically along said axis; the first transmission location or each first transmission location and the first reception location or each first reception location being arranged in symmetrically opposed positions about a mid point of said axis to the second transmission location or each second transmission location and the second reception location or each second reception location; measuring the time taken for the electromagnetic radiation to propagate from the first transmission location or each first transmission location to the first reception location or each second reception location; measuring the time taken for the electromagnetic radiation to propagate from the first transmission location or each first transmission location to the first reception location or each first reception location and from the second transmission means or each second transmission location to the second reception location or each second reception location by reflection from said object; and determining from the measured time which direction the first transmission location or each first transmission location, the first reception location or each first reception location, the second transmission location or each second transmission location and the second reception location or each second reception location should be moved to position said mid point of said axis so that said object lies in a direction extending perpendicularly to said axis from said mid point.

30. A system for determining a position on the surface of a medium closest to an object at a depth i said medium, said medium having a permittivity substantially different to the permittivity of said object, the system comprising first transmitter means for transmitting electromagnetic radiation into said medium for reflection by said object; second transmitter means for transmitting electromagnetic radiation into said medium for reflection by said object; first receiver means for receiving radiation transmitted by said first transmitter means and reflected by said object; second receiver means for receiving radiation transmitted by said second transmitter means and reflected by said object; each of said first and second transmitter means being arranged in use to transmit electromagnetic radiation from either one or a plurality of first or second transmission location respectively along an axis over said surface of said medium in the vicinity of said object, and each of said first and second receiver means being arranged in use to receive electromagnetic radiation either at one first or second receiver location respectively along said axis from said plurality of first or second transmission locations respectively after reflection from said object, or at least a plurality of first or second reception locations respectively along said axis from either said one or said plurality of first or second transmission locations respectively after reflection from said object, the first transmission location or each first transmission location and the first reception location or each first reception location being separated by predetermined distances and arranged asymmetrically along said axis, the second transmission location or each second transmission location and the second reception location or each second reception location being separated by predetermined distances and arranged asymmetrically along said axis, the first transmission location or each first transmission location and the first reception location or each first reception location being arranged in symmetrically opposed positions about a mid point of said axis to the second transmission location or each second transmission location and the second reception location or each second reception location; the system including measurement means to measure the time taken for the first electromagnetic radiation to propagate from the first transmission location or each first reception location top the first reception location or each first reception location and from the second transmission location or each second transmission location to the second reception location or each second reception location by reflection from said object; ad determination means to determine from the measured times and said predetermined distances:

a) which direction the first transmission location or each first transmission location, the second transmission location or each second transmission location, the second transmission location or each second transmission location and the second reception location or each second reception location should be moved to position said mid point of said axis so that said object lies in a direction extending perpendicularly to said axis from said mid point; and b) the depth of said object.

31. A method of determining a position of the surface of a medium closest to an object at a depth in said medium, said medium having a permittivity substantially different to the permittivity of said object, the method comprising the steps of: transmitting electromagnetic radiation into said medium from either one or a plurality of first transmission locations and from either one or a plurality of second transmission locations arranged along an axis over the surface of said medium in the vicinity of said object; receiving electromagnetic radiation either at one first reception location along said axis from said plurality of first transmission locations after reflection from said object, or at a plurality of first reception locations along said axis from either said one or said plurality of first transmission locations after reflection from said object; receiving electromagnetic radiation either at one second reception location along said axis from said plurality of second transmission locations after reflection from said object, or at a plurality of second reception locations along said axis from either said one or said plurality of second transmission locations after reflection from said object; the first transmission location or each first transmission location and the first reception location or each first reception location being separated by predetermined distances and arranged asymmetrically along said axis; the second transmission location or each second transmission location and the second reception location or each second reception location being separated by predetermined distances and arranged asymmetrically along said axis; the first transmission location or each first transmission location and the first reception location or each first reception location being arranged in symmetrically opposed positions about a mid point of said axis to the second transmission location or each second transmission location and the second reception location or each second reception location; measuring the time taken for the electromagnetic radiation to propagate from the first transmission location or each first transmission location to the first reception location or each first reception location and from the second transmission location or each second transmission location to the second reception location or each second reception location by reflection from said object; and determining from the measured times and said predetermined distances:

a) which direction the first transmission locations or each first transmission locations, the first reception location or each first reception location, the second transmission location or each second transmission location and the second reception location or each second reception location should be moved to position said mid point of said axis so that said object lies in a direction extending perpendicularly to said axis from said mid point; and b) the depth of said object.

* * * * *

UNITED STATES PATENT AND TRADEMARK OFFICE
CERTIFICATE OF CORRECTION

PATENT NO. : 6,002,357
DATED : December 14, 1999
INVENTOR(S) : Redfern et al.

It is certified that error appears in the above-identified patent and that said Letters Patent is hereby corrected as shown below:

In the Claims:

Claim 2, column 14, line 51, before "transmitter", insert -- said --.

Claim 23, column 17, line 11, cancel "reflection", and insert -- reception --.

Claim 28, column 18, line 12, after "received", insert -- signals to provide a signal at a frequency --.

Claim 29, column 18, line 19, delete "of", insert -- or --.

Claim 29, column 18, line 21, delete "i", insert -- in --.

Claim 29, column 18, line 38, delete "means", insert
-- location --.

Claim 29, column 18, line 54, delete "means", insert
-- location --.

UNITED STATES PATENT AND TRADEMARK OFFICE
CERTIFICATE OF CORRECTION

PATENT NO.  : 6,002,357
DATED       : December 14, 1999
INVENTOR(S) : Redfern et al It is certified that error appears in the above-indentified patent and that said Letters Patent is hereby corrected as shown below:

Claim 30, column 18, line 66, delete "i", insert --in--.

Claim 30, column 19, line 39, delete "top", insert --to--.

Claim 30, column 19, line 43, delete "ad", insert --an--.

UNITED STATES PATENT AND TRADEMARK OFFICE
CERTIFICATE OF CORRECTION

PATENT NO. : 6,002,357
DATED : December 14, 1999
INVENTOR(S) : Redfern et al.

It is certified that error appears in the above-indentified patent and that said Letters Patent is hereby corrected as shown below:

Claim 30, column 19, lines 49 and 50, delete "second transmission" (first occurrence), insert --first reception--.

Claim 30, column 19, lines 49 and 50, delete "second transmission" (second occurrence), insert --first reception--.

Column 1, line 15, delete "Objects", insert -- Electromagnetic indication can be used to locate objects--

Signed and Sealed this

Thirteenth Day of March, 2001

Attest:

NICHOLAS P. GODICI

*Attesting Officer*   *Acting Director of the United States Patent and Trademark Office*